United States Patent
Maiorana et al.

(10) Patent No.: US 11,356,472 B1
(45) Date of Patent: Jun. 7, 2022

(54) SYSTEMS AND METHODS FOR USING MACHINE LEARNING FOR GEOGRAPHIC ANALYSIS OF ACCESS ATTEMPTS

(71) Applicant: Wells Fargo Bank, N.A., San Francisco, CA (US)

(72) Inventors: Nicola A. Maiorana, Charlotte, NC (US); Bryan D. Hall, Charlotte, NC (US); Richard Joseph Schroeder, Charlotte, NC (US)

(73) Assignee: Wells Fargo Bank, N.A., San Francisco, CA (US)

(*) Notice: Subject to any disclaimer, the term of this patent is extended or adjusted under 35 U.S.C. 154(b) by 366 days.

(21) Appl. No.: 16/716,346

(22) Filed: Dec. 16, 2019

(51) Int. Cl.
- *H04L 9/40* (2022.01)
- *G06K 9/62* (2022.01)
- *G06N 20/00* (2019.01)

(52) U.S. Cl.
CPC ........ *H04L 63/1458* (2013.01); *G06K 9/6267* (2013.01); *G06N 20/00* (2019.01); *H04L 63/1416* (2013.01); *H04L 63/1425* (2013.01)

(58) Field of Classification Search
CPC ............ H04L 63/1458; H04L 63/1416; G06K 9/6267; G06N 20/00
See application file for complete search history.

(56) References Cited

U.S. PATENT DOCUMENTS

| | | | | |
|---|---|---|---|---|
| 10,516,695 | B1* | 12/2019 | Evans | H04L 63/1425 |
| 2012/0215907 | A1* | 8/2012 | Chung | G06F 21/554 |
| | | | | 709/224 |
| 2014/0283085 | A1* | 9/2014 | Maestas | H04L 63/1433 |
| | | | | 726/25 |
| 2015/0172321 | A1* | 6/2015 | Kirti | H04L 63/1425 |
| | | | | 726/1 |
| 2016/0014081 | A1* | 1/2016 | Don, Jr | H04L 63/0236 |
| | | | | 726/11 |
| 2017/0048260 | A1* | 2/2017 | Peddemors | H04L 63/1416 |
| 2019/0222601 | A1* | 7/2019 | Bardenstein | H04L 63/1408 |
| 2020/0225964 | A1* | 7/2020 | Soman | G06N 20/00 |
| 2020/0236099 | A1* | 7/2020 | Mitchell | H04L 63/1425 |

OTHER PUBLICATIONS

A. Renjan, K. P. Joshi, S. N. Narayanan and A. Joshi, "DAbR: Dynamic Attribute-based Reputation scoring for Malicious IP Address Detection," 2018 IEEE International Conference on Intelligence and Security Informatics (ISI), 2018, pp. 64-69, doi: 10.1109/ISI.2018.8587342. (Year: 2018).*

* cited by examiner

*Primary Examiner* — Robert B Leung
(74) *Attorney, Agent, or Firm* — Schwegman Lundberg & Woessner, P.A.

(57) ABSTRACT

Disclosed herein are systems and methods for using machine learning for geographic analysis of access attempts. In an embodiment, a trained machine-learning model classifies source IP addresses of login attempts to a system as either blacklisted or allowed based on a set of aggregated features that correspond to login attempts to the system from the source IP addresses. The set of aggregated features includes, in association with each respective source IP address, a geographical login-attempt failure rate of login attempts to the system from each of one or more geographical areas that each correspond to the respective source IP address. Source IP addresses that are classified by the machine-learning model as blacklisted are added to a system blacklist, such that the system will disallow login attempts from such source IP addresses.

20 Claims, 10 Drawing Sheets

SYSTEMS AND METHODS FOR USING MACHINE LEARNING FOR GEOGRAPHIC ANALYSIS OF ACCESS ATTEMPTS

BACKGROUND

Billions of people around the world use various different communication and computing devices on a daily basis for many different purposes such as social networking, conducting personal business (e.g., financial transactions), conducting work-related activities, online shopping, browsing the web and/or engaging in other forms of Internet communication for entertainment purposes or to gather the news of the day, and/or the like. Indeed, digital communications and computing have become increasingly ubiquitous presences in modern life, and that trend is only expected to continue.

With the increased use and pervasiveness of digital communications and computing comes increased complexity. As an example, a financial-services institution may interact with its customers many billions of times per year in ways such as in person at storefront locations (e.g., banks), online (via, e.g., web portals, mobile applications ("apps"), and/or the like), at automated teller machines (ATMs), on the telephone, and/or the like. There are many organizations, such as large, complex, multinational corporations (including financial-services institutions), that operate and manage large, complex information technology (IT) ecosystems for both internal operations and for customer-facing activities, among other purposes. These ecosystems typically contain many different interoperating systems, servers, applications, interfaces, and the like. It is important to such organizations and their customers that these ecosystems operate reliably and effectively.

One ongoing, seemingly ever-present threat to the continued reliable and effective operation of these ecosystems—and indeed of many online systems and other resources—is the repeated attempts by nefarious actors to gain access (e.g., log in) to these systems, attempting to appear to such systems to be valid, authorized users. These malicious login attempts are carried out by both actual people and by programs (e.g., so-called "bots") that these bad actors create or at least use. These attackers, including both people and bots, are persistent, and continue to adjust their attack strategies in an effort to circumvent defensive measures. They often obtain lists that may or may not contain identifiers (e.g., usernames) of valid users of a system. Their attacks are accordingly often aimed at attempting to narrow such lists down to those identifiers that are associated with valid accounts, which the attackers then try to exploit in some manner. IT teams, fraud-prevention teams, and/or others count among their goals to protect their respective ecosystems, and thus their customers, against fraudulent access (e.g., login) attempts and other threats.

Overview

Among other inspirations, motivations, and realizations, embodiments of the present disclosure spring from a recognition that, with respect to adjusting their respective attack patterns over time, some attackers have moved at least partially, from a first type of attack pattern to a second type of attack pattern. According to the first type of attack pattern, numerous login attempts are initiated from a relatively small number of source Internet Protocol (IP) addresses. According to the second type of attack pattern, a relatively lesser amount of login attempts (on a per-source-IP-address basis) are initiated from a collectively larger number of source IP addresses. The attackers utilizing this second type of attack pattern are likely trying to better mimic the login-attempt patterns of valid users, which often tend to follow a similar pattern of emanating from a relatively large number of source IP addresses with a relatively smaller number of such login attempts coming from any given one of those addresses.

This second type of attack pattern—i.e., lower-volume-per-source-IP-address—has been facilitated and enabled to some extent by the increasing availability of cloud-computing resources such as server farms, from which attackers can obtain the use of a larger number of source IP addresses than may have previously been readily available to them. Embodiments of the present disclosure further spring at least in part from the recognition that, although the source IP addresses—that are being used by attackers that are taking this second type of approach—are more numerous, these addresses still quite often tend to be geographically clustered. As such, embodiments of the present disclosure harness the power of machine learning in a manner that is geographically focused, in order to identify and thwart (e.g., deny access to) such attackers.

Accordingly, disclosed herein are systems and methods for using machine learning for geographic analysis of access attempts. In some embodiments, a trained machine-learning model uses a dynamic machine-learning approach to recognize patterns of high login-attempt failure rates by geographic location of the source IP address of login attempts. Multiple different geographic granularities are used in parallel in some embodiments, such as taking into account the login-failure rates in all three of the country, the region within that country, and the city within that region that are associated geographically with a given source IP address. Other features are used in various embodiments as well. Some example features that are used in some embodiments include a system-wide login-attempt failure rate, an IP-address-specific login-attempt failure rate, and a binary indicator of being located (or not) in a specific geographic area (e.g., a specific country), among other example model features that are described herein.

In various different embodiments, a login-attempt failure rate that is used as a model feature could be a login-attempt failure rate for all time, or could be aggregated with respect to a timeframe (e.g., an hour that ended in the previous minute), among many other examples that could be listed here. Moreover, a given login-attempt failure rate may be calculated as a ratio of a number of login-attempt failures to a total number of login attempts (e.g., within a given geographical area and/or during a particular timeframe, and/or the like), though other calculations of login-attempt failure rates (e.g., a ratio of login-attempt failures to login-attempt successes) could be used as well.

One example embodiment takes the form of a method that includes classifying, using a machine-learning model, each of a plurality of source IP addresses as either blacklisted or allowed, where the source IP addresses correspond to login attempts to a system. The classifying is performed based on a set of aggregated features that correspond to login attempts to the system from the source IP addresses that are being classified. The machine-learning model has been trained to classify source IP addresses as either blacklisted or allowed based on training data and according to the set of aggregated features, which includes, in association with each respective source IP address, a geographical login-attempt failure rate of login attempts to the system from each of one or more geographical areas that each correspond to the respective source IP address. The method also includes adding, to a system blacklist for the system, any source IP addresses that are classified by the machine-learning model as blacklisted. The system is configured to disallow login attempts from any source IP addresses on the system blacklist.

Another embodiment takes the form of a computing system that includes at least one processor and data storage containing instructions executable by the at least one processor for causing the computing system to perform at least the operations that are listed in the preceding paragraph. Still another embodiment takes the form of one or more non-transitory computer-readable storage media (CRM) containing instructions that, when executed by at least one processor, cause the at least one processor to perform at least those operations.

Furthermore, a number of variations and permutations of the above-listed embodiments are described herein, and it is expressly noted that any variation or permutation that is described in this disclosure can be implemented with respect to any type of embodiment. For example, a variation or permutation that is primarily described in this disclosure in connection with a method embodiment could just as well be implemented in connection with a computing-system embodiment and/or a CRM embodiment. Furthermore, this flexibility and cross-applicability of embodiments is present in spite of any slightly different language (e.g., processes, methods, methodologies, steps, operations, functions, and/or the like) that is used to describe and/or characterize such embodiments and/or any element or elements thereof.

BRIEF DESCRIPTION OF THE DRAWINGS

A more detailed understanding may be had from the following description, which is presented by way of example in conjunction with the following drawings, in which like reference numerals are used across the drawings in connection with like elements.

DETAILED DESCRIPTION

Figure 1:
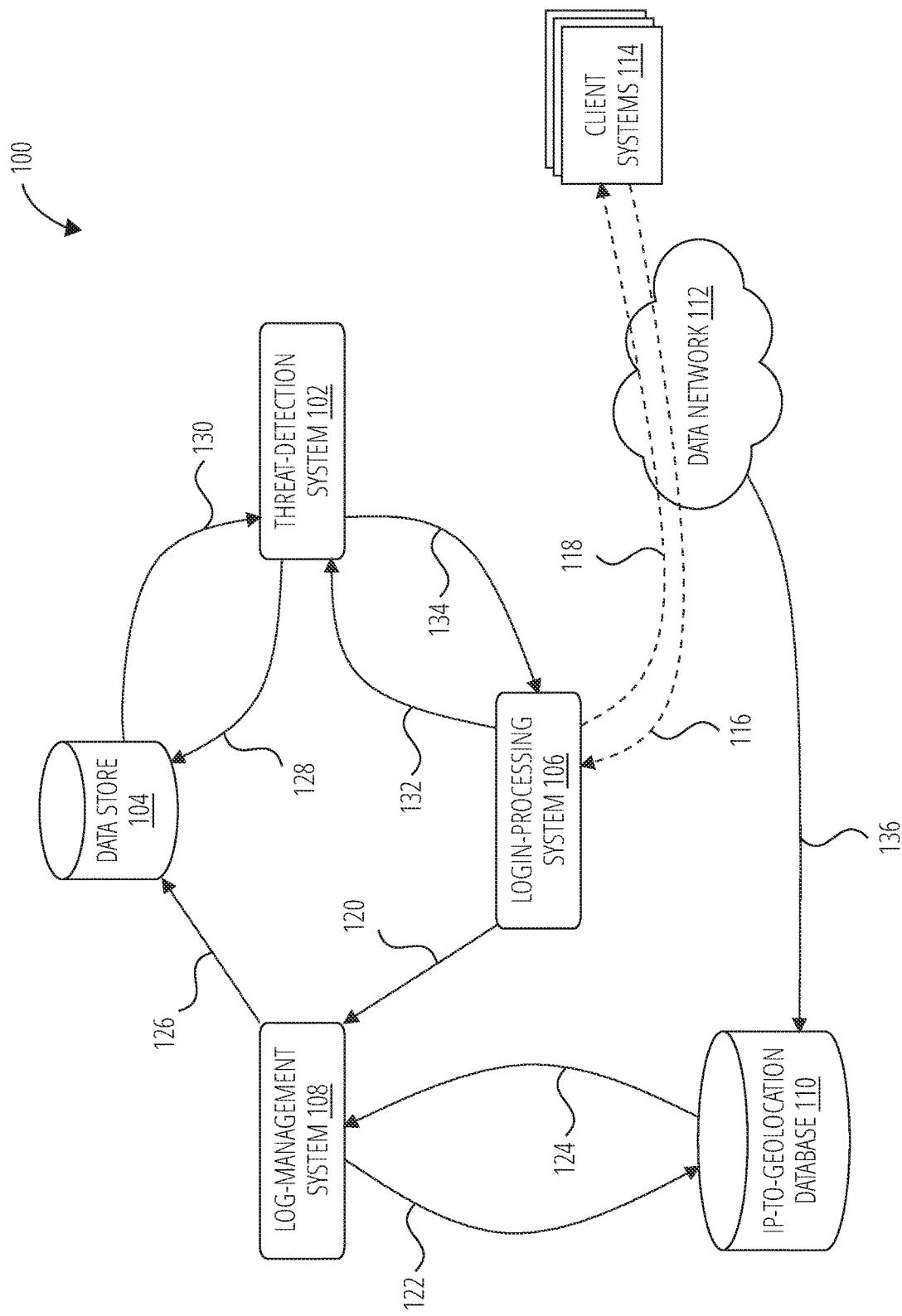
FIG. 1 illustrates an example communication context in which at least one embodiment can be carried out, where the example communication context includes an example threat-detection system, in accordance with at least one embodiment.

FIG. 1 illustrates an example communication context 100 in which at least one embodiment of the present disclosure can be carried out. The communication context 100 is provided purely by way of example and not limitation, as embodiments of the present disclosure can be carried out in numerous different types of communication contexts having different numbers, types, and/or arrangements of devices, networks, and/or the like. Moreover, in different embodiments, one or more of the entities that are depicted in FIG. 1 could be distributed into multiple different components. Similarly, two or more of the entities that are depicted in FIG. 1 could be combined into fewer components. One or more functional aspects of any given entity could be realized as a standalone component and/or combined with one or more functional aspects of any one or more of the other entities. This flexibility with respect to the distribution, centralization, and/or consolidation of functional aspects of the depicted entities also applies to entities that are depicted in the other figures.

Moreover, a number of arrows are depicted and labeled with reference numerals in FIG. 1 and in some of the other figures. In a number of instances, these arrows are described herein according to the information conveyed along them. It is to be understood that these arrows could represent and/or utilize wired and/or wireless communication links between the various entities. Indeed, any one or more of the communication links depicted in FIG. 1 or in any of the other figures could include one or more wired-communication links (e.g., Ethernet, fiber optic, Universal Serial Bus (USB), and/or the like) and/or one or more wireless-communication links (e.g., Wi-Fi, LTE, Bluetooth, Bluetooth Low Energy, and/or the like). Any communication protocols could be used as deemed suitable by those of skill in the art for a given implementation. Moreover, any one or more of the communication links could include one or more intermediate devices such as routers, bridges, servers, access points, base stations, and/or the like. Any communication link could include one or more virtual private networks (VPNs) and/or other tunneling-type connections, and could utilize one or more security measures such as encryption.

In the example that is depicted in FIG. 1, the communication context 100 includes a threat-detection system 102, a data store 104, a login-processing system 106, a log-management system 108, an IP-to-geolocation database 110, a data network 112, and a plurality of client systems 114. As described above, this depiction is by way of example and not limitation, as different types and/or numbers of entities could be present in different examples. Any (computing and/or communication) entity that is depicted in FIG. 1 and/or any of the other figures could have an architecture similar to that described below in connection with respect to the example machine 900 of FIG. 9, and could execute software having a structure similar to that described below in connection with the example software architecture 1002 of FIG. 10. Moreover, any one or more of these entities could host (e.g., execute) all or part of any of the applications, functions, and/or the like that are described herein by way of example, and/or any other applications, functions, and/or the like that are deemed suitable by those of skill in the art for a given implementation or in a given context.

In at least one embodiment, in some cases along with one or more other entities, the threat-detection system 102, the data store 104, the login-processing system 106, and the log-management system 108 are managed as part of a collective IT ecosystem for an organization such as a financial-services institution. These four entities may be collectively referred to herein at times herein as an enterprise system, which could also include the IP-to-geolocation database 110, though in some embodiments the latter entity is external to the enterprise system.

Moreover, reference made herein to "a system" or "the system" to which, in a given embodiment, attempts are being made to log in, refers only to the login-processing system 106 and/or to one or more other services or entities (e.g., a web server, an application server, and/or the like) to which a successful login attempt via the login-processing system 106 would provide access. In some embodiments, the "system" to which login attempts are being directed could refer to a combination of the threat-detection system 102 and the login-processing system 106, or to a combination of all of the entities in the enterprise system. In some embodiments, the threat-detection system 102 and the login-processing system 106 are different functional parts that are both implemented by a single component (e.g., a server). In other embodiments, those two entities are realized in or as physically separate entities (e.g., servers). Furthermore, one or more of the entities that are depicted in FIG. 1 could include a user interface or provide, e.g., administrative access over a network to a management interface and/or the like.

The client systems 114 represent a plurality of different devices and systems that can be used to attempt to log in to a system via the login-processing system 106. The client systems 114 could include servers (e.g., at server farms), bots, personal computers (e.g., desktops, laptops), mobile devices (e.g., executing mobile apps), and/or the like. As an additional example, any one or more of the client systems 114 could be or include an automated teller machine (ATM) that provides conventional ATM-type services such as cash withdrawal, check deposit, account transfers, balance inquiries, bill payment, and/or the like. Users could access such ATMs using a secure card, a mobile device, and/or the like, along with security credentials such as a personal identification number (PIN), password, passcode, and/or the like. In some implementations, biometric authentication is used by one or more client systems 114, such as by one or more ATMs.

As shown in FIG. 1, individual client systems 114 submit login requests 116 via the data network 112 to the login-processing system 106. The processing of such login requests 116 is further described herein. After processing the login requests 116, the login-processing system 106 transmits login responses 118 via the data network 112 to the client systems 114. The login responses 118 could be login-granted responses, login-denied responses, or further-processing responses, as examples. An example of a further-processing response could be a request to answer one or more security questions, a request to enter a one-time password (e.g., numerical code) that is texted to a user's mobile device and/or e-mailed to a user's e-mail address, a request to enter a code from an authenticator app, and/or the like. Such further-processing responses are examples of supplementary authentication protocols that are often referred to as falling under the rubric of two-factor authentication (2FA).

In an example scenario, the data network 112 could be a data-communication network such as, including, or in communication with the Internet. The data network 112 could operate according to a suite of communication protocols such as Transmission Control Protocol (TCP) and IP (collectively, TCP/IP), User Datagram Protocol (UDP) and IP (collectively, UDP/IP), and/or others. Furthermore, the data network 112 could be or include a private IP network that is operated by an institution such as a financial-services institution as an example. In addition to other functions such as those described herein, the login-processing system 106 could provide network-access-server (NAS) functions, gateway services, firewall protections, and/or the like between the data network 112 and entities such as one or more of the threat-detection system 102, the data store 104, the log-management system 108, and the IP-to-geolocation database 110, as examples. Any of the entities in communication with one another in the communication context 100, whether via the data network 112 or not, could communicate via a VPN and/or another type of secure-tunneling communication protocol, connection, and/or the like. Such communications could be encrypted.

As depicted in FIG. 1, the login-processing system 106 transmits login-attempt event records 120 to the log-management system 108. The transmission by the login-processing system 106 of the login-attempt event records 120 to the log-management system 108 may or may not be part of the procedures that the login-processing system 106 carries out to actually process the login requests 116 to determine how to handle them (e.g., whether to grant them, deny them, submit them to further processing, etc.). Some example data that could be included in one or more of the login-attempt event records 120 includes data items that are received by the login-processing system 106 in the respective login requests 116. These data items could include fields such as source IP address, username, user agent string, nonce value, and/or other request-header information. A user agent string could be a set of request-header metadata that indicates information such as web-browser type, web-browser version, operating system being run on the respective one of the client systems 114, and/or the like. In an embodiment, the login-attempt event records 120 that are transmitted from the login-processing system 106 to the log-management system 108 do not include geolocation data that, if present, would indicate a geographic location associated with the particular login requests 116 that correspond to the particular login-attempt event records 120.

In at least one embodiment, among other functions, the log-management system 108 is configured to receive the login-attempt event records 120 from the login-processing system 106, augment those login-attempt event records 120 with geolocation information, and then transmit corresponding location-appended login-attempt event records 126 to the data store 104. Upon receiving various login-attempt event records 120, the log-management system 108 may use the source-IP-address information contained therein to send location queries 122 (that include, i.e., are keyed to, those source IP addresses) to the IP-to-geolocation database 110, which may accordingly process the location queries 122 and return corresponding location-query results 124 to the log-management system 108. The returned location-query results 124 may include a geolocation, if one can be identified, for each of the source IP addresses in the various corresponding location queries 122. Such geolocation could be in terms of global positioning system (GPS) coordinates, a latitude and longitude, an area code, a zip code, a city, a region, a country, and/or the like.

Moreover, although pictured in FIG. 1 as data-storage containers, either or both of the data store 104 and the IP-to-geolocation database 110 could include, in addition to one or more data-storage devices, computers, servers, and/or the like, one or more database servers that operate to serve requests to carry out database operations, where such database operations could include operations to query data, store data, retrieve data, extract data, modify data, update data, remove data, and/or the like. Furthermore, although the data store 104 and the IP-to-geolocation database 110 are shown as being in respective single network locations in the communication context 100, either or both of the data store 104 and the IP-to-geolocation database 110 could include multiple different data silos in multiple different geographic and/or network-topology locations. Other data-storage architectures could be used as well.

As depicted in FIG. 1, the IP-to-geolocation database 110 could receive IP-to-geolocation-database updates 136, for example periodically and/or in response to requests transmitted by the IP-to-geolocation database 110 to a network server (not pictured) via the data network 112. A number of different IP-to-geolocation databases, services, and/or the like could be used in implementing the IP-to-geolocation database 110. In at least some embodiments, the IP-to-geolocation database 110 is implemented at least in part using an IP GeoPoint database provided by Neustar, Inc., which is headquartered in Sterling, Va. Another option is to use one or more of the GeoIP2 and/or GeoLite2 databases provided by MaxMind, Inc., which is headquartered in Waltham, Mass. Yet another option is to use one or more of the IP2Location databases provided by IP2Location, which is a subsidiary of Hexasoft Development Sdn. Bhd., which is headquartered in Penang, Malaysia. And certainly other options could be listed here as well. Moreover, other architectural approaches could be used instead. For example, the login-processing system 106 could transmit the login-attempt event records 120 directly to the data store 104 for storage, and the data store 104 could then use an internal and/or external query and/or merge function to augment the respective login-attempt event records 120 with geolocation data indicative of the geographical location associated with, e.g., the source IP addresses of the respective login-attempt event records 120, which as discussed, correspond to the login requests 116.

As mentioned, in the architectural approach that is depicted in FIG. 1, the log-management system 108 transmits the location-appended login-attempt event records 126 for storage at the data store 104, which could house one or more particular types of data pertaining to one or more of the applications operating within the ecosystem of the associated institution. In some embodiments, the data store 104 is implemented using a database management and analytics platform such as Splunk Enterprise, developed by Splunk Inc., which is headquartered in San Francisco, Calif. Other database-management platforms could be used in addition or instead, such as one or more database products offered by Oracle Corporation, which is headquartered in Redwood City, Calif. In some embodiments, rather than or in addition to using a data store such as the data store 104, a real-time feed or stream of location-appended login-attempt event records 126 is used.

In the embodiment that is depicted in FIG. 1, the threat-detection system 102 transmits periodic login-attempt event-record queries 128 to the data store 104, seeking the latest location-appended login-attempt event records 126 stored by the data store 104 since the previous one of the login-attempt event-record queries 128. In an embodiment, the threat-detection system 102 sends the login-attempt event-record queries 128 to the data store 104 every 30 seconds, though certainly other periods (e.g., 10 seconds, 1 minute, 5 minutes, 30 minutes, 1 hour, etc.) could be used. In response to the login-attempt event-record queries 128, the data store 104 transmits login-attempt event-record updates 130 to the threat-detection system 102 on, e.g., the same period at which the login-attempt event-record queries 128 are sent by the threat-detection system 102 to the data store 104. Moreover, it is explicitly noted that the threat-detection system 102 may periodically (e.g., once every 30 seconds) assess a prior time window that has a duration (e.g., 60 minutes) that differs from the period at which the threat-detection system 102 receives the login-attempt event-record updates 130 from the data store 104. Either or both of these numbers can vary, but in at least one embodiment, the threat-detection system 102 makes assessments every 30 seconds based on a rolling window of the hour that ended on the most recent 30-second boundary.

The inner workings of the threat-detection system 102 are discussed in more detail in connection with some of the other figures, but suffice it to say for this description of FIG. 1 that, in at least one embodiment, the threat-detection system 102 maintains a system blacklist, and determines whether any of the source IP addresses that are associated with a most recent group (e.g., the group corresponding to the previous hour, updated in the previous 30 seconds) of location-appended login-attempt event records 126 obtained by the threat-detection system 102 in the login-attempt event-record updates 130 should be added to the system blacklist. As shown in FIG. 1, the login-processing system 106 sends blacklist queries 132 to the threat-detection system 102, for example on a periodic basis such as once every 30 seconds (or a different period). In response to the blacklist queries 132, the threat-detection system 102 sends blacklist updates 134 to the login-processing system 106. In other embodiments, the threat-detection system 102 could send blacklist updates 134 without receiving any blacklist queries 132. For example, the threat-detection system 102 could send blacklist updates 134 to the login-processing system 106 periodically without being asked, upon identifying a certain number of newly blacklisted source IP addresses, upon identifying each newly blacklisted source IP address, or according to another approach deemed suitable by those of skill in the art for a given implementation. Moreover, it is noted that any given instance of the blacklist updates 134 could reflect no changes to the system blacklist, or could reflect one or more additions to the system blacklist and/or one or more subtractions from the system blacklist.

In operation, the login-processing system 106 uses the system blacklist, as updated according to the blacklist updates 134, as one of its inputs in determining how to process the various login requests 116 that the login-processing system 106 receives from the client systems 114. Other aspects regarding the content and enforcement of the system blacklist are discussed in connection with some of the other figures. In at least one embodiment, the login-processing system 106 is configured to deny any of the login requests 116 that originate from a source IP address that is currently found on the system blacklist. In at least one embodiment, the login responses 118 that correspond to any such login requests 116 do not inform the associated client systems 114 that they are being blocked or that their IP address is being blocked or that their IP address has been blacklisted, or otherwise provide any such blacklist-related information. Instead, in at least one embodiment, the login-processing system 106 simply shunts such client systems 114 to the same page and/or message as any other login failure, where such page and/or message contains a generic, somewhat innocuous and intentionally uninformative indication that, for example, the provided combination of username and password does not match the system's records. Other implementations are certainly possible.

Moreover, in at least one embodiment, the threat-detection system 102 manages the source IP addresses on the system blacklist in accordance with an aging protocol. For example, a source IP address that is added to the system blacklist for the first time may remain on the system blacklist for a first-offense "sentence" on the order of 5-10 minutes, as an example, and then be placed on "parole" for a period on the order of 6-8 hours or so. If a second offense occurs during that parole period, the source IP address may be put back on the blacklist for a second-offense sentence on the order of 20-60 minutes, again just as an example. These tiers could continue, for example up to a maximum "sentence" on the order of 6-8 hours. In some implementations, a second (or subsequent) offense takes the form of any login attempt from the offending source IP address while on parole. In other implementations, a second (or subsequent) offense takes the form of at least a threshold number of login attempts from the paroled source IP address. The login-processing system 106 could be arranged to inform the threat-detection system 102 of second (and subsequent) offenses in connection with various source IP addresses. If the source IP address is then dropped from the blacklist and reoffends at a later time, it may be placed on the blacklist again as a first offender. Other schemes could be used as well, and blacklist periods, parole periods, number of offense tiers, and/or the like could certainly be varied in different implementations.

Figure 2:
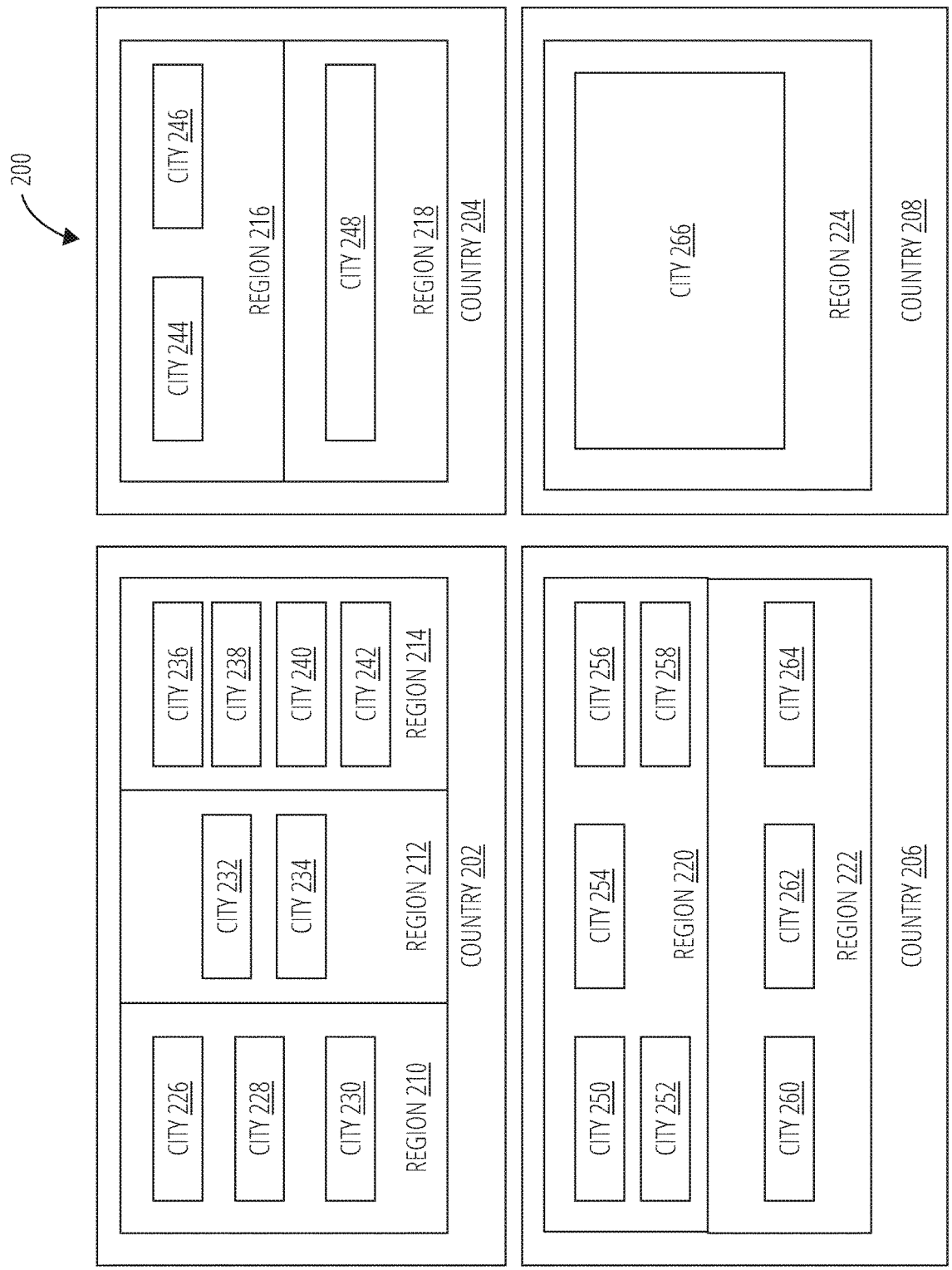
FIG. 2 illustrates an example geographical context, in accordance with at least one embodiment.

FIG. 2 illustrates an example geographical context 200, in accordance with at least one embodiment. As described herein, embodiments of the present disclosure use machine learning in a way that is geographically focused, in order to identify and thwart (e.g., deny access to) attackers that attempt to log in to a system. The geographical context 200 is not meant to accurately physically represent any particular geographical area, but is instead meant to provide an example hierarchy of some example geographical areas.

The geographical context 200 includes four countries: a country 202, a country 204, a country 206, and a country 208. The country 202 includes three regions: a region 210, a region 212, and a region 214. The region 210 includes three cities: a city 226, a city 228, and a city 230. The region 212 includes two cites: a city 232 and a city 234. The region 214 includes four cities: a city 236, a city 238, a city 240, and a city 242. The country 204 includes a region 216 (that includes a city 244 and a city 246) and a region 218 (that includes only a single city 248). The country 206 includes two regions: a region 220 (that includes five cities: a city 250, a city 252, a city 254, a city 256, and a city 258) as well as a region 222 (that includes three cities: a city 260, a city 262, and a city 264). Lastly, the country 208 includes only a single region 224 that itself includes only a single city 266.

Again, the geographical context 200 is provided by way of example and to facilitate further discussion of example embodiments in connection with the other figures. It is noted that a region could be either intra-country or inter-country, although all of the regions that are depicted in FIG. 2 are intra-country. Moreover, additional and/or different geographic slices could be used in various different embodiments. Some other example delineations that could be used instead of or in addition to those depicted in FIG. 2 include hemisphere, province, state, county, postal code, area code, borough, and neighborhood, just to name a few.

As described herein, embodiments of the present disclosure utilize a geotargeting machine-learning model to blacklist source IP addresses based on, in some cases among other variables and features, aggregated login-failure rates in various different geographic slices such as those depicted in FIG. 2. In a given example, a source IP address could be determined to be associated with the city 244. As such, an embodiment may assess login-attempt failure rates in one, some, or all of the city 244, the region 216, and the country 204. Various other examples could be listed here as well.

Figure 3:
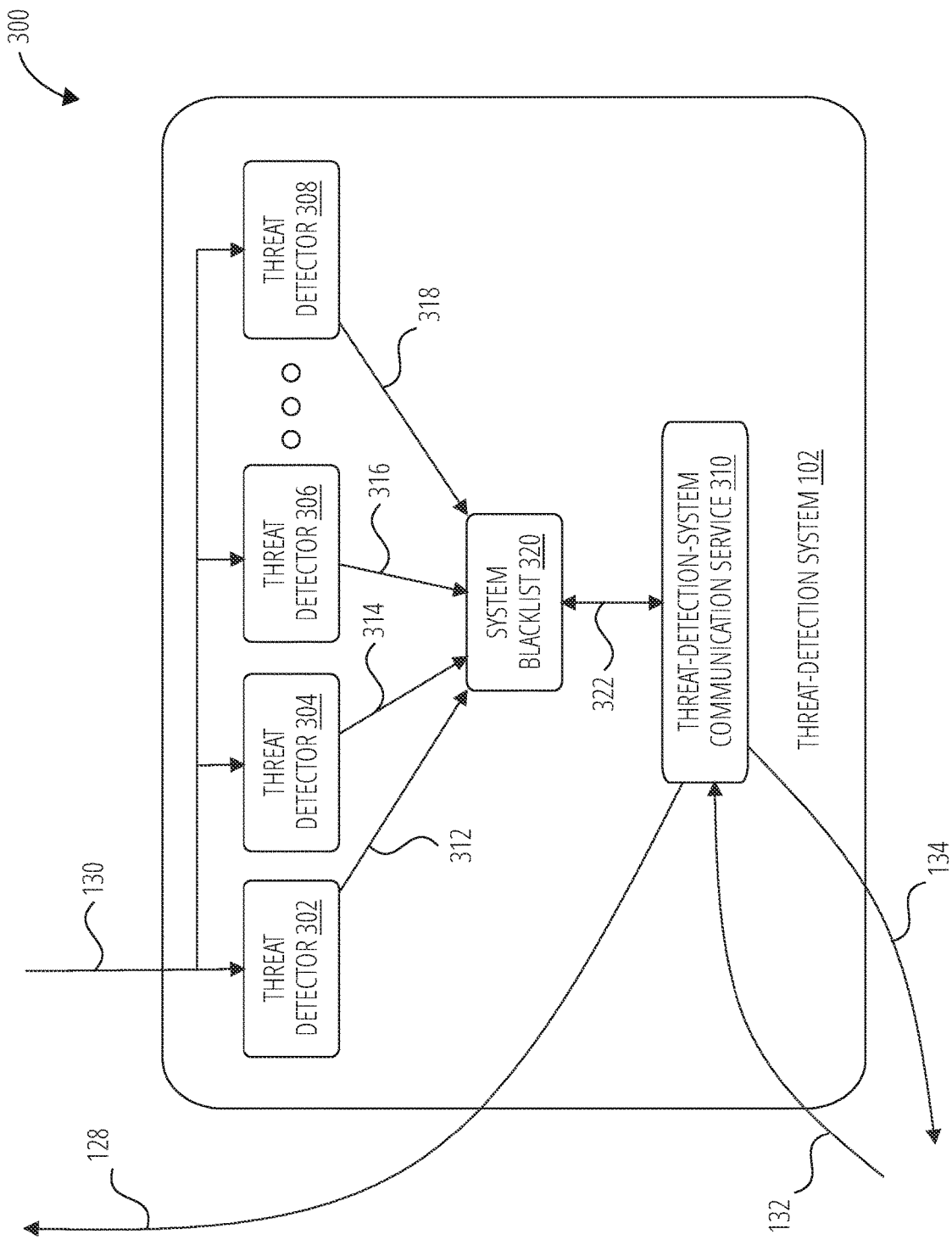
FIG. 3 illustrates an example architecture of the example threat-detection system of FIG. 1, where the example threat-detection system includes an example threat detector, in accordance with at least one embodiment.

FIG. 3 illustrates an example architecture 300 of the threat-detection system 102 of FIG. 1, in accordance with at least one embodiment. In the embodiment that is depicted in FIG. 3, the threat-detection system 102 includes multiple modules that are referred to herein as threat detectors: a threat detector 302, a threat detector 304, a threat detector 306, and a threat detector 308. As indicated by the ellipsis between the threat detector 306 and the threat detector 308, there could be any number of threat detectors in a given implementation. Some embodiments include only a single threat detector, while other embodiments include more than one. The threat-detection system 102 also includes a threat-detection-system communication service 310 and a system blacklist 320.

The login-attempt event-record updates 130, which are transmitted to the threat-detection system 102 by the data store 104, are shown in FIG. 3 as being distributed to each of the threat detectors. This is by way of example and not limitation, as different threat detectors could receive different data feeds from different sources in different embodiments. Moreover, even in the depiction of FIG. 3, different ones of the depicted threat detectors could receive different aspects (e.g., subsets) of the login-attempt event-record updates 130. For example, one or more of the threat detectors could receive data related to source IP addresses of login attempts whereas one or more of the other threat detectors could receive data related to nonce values, usernames, user agent strings, and/or the like.

As shown in FIG. 3, each of the threat detectors communicates a respective blacklist feed to the system blacklist 320: the threat detector 302 communicates a blacklist feed 312, the threat detector 304 communicates a blacklist feed 314, the threat detector 306 communicates a blacklist feed 316, and the threat detector 308 communicates a blacklist feed 318. Moreover, the threat-detection-system communication service 310 communicates with the system blacklist 320 over a link 322. The threat-detection-system communication service 310 transmits the login-attempt event-record queries 128 to the data store 104, as well as the blacklist updates 134 to the login-processing system 106. The threat-detection-system communication service 310 also receives the blacklist queries 132 from the login-processing system 106. It is further noted that the threat-detection-system communication service 310 could also handle the receipt and distribution to the various threat detectors of the login-attempt event-record updates 130, and that the manner of depiction of the login-attempt event-record updates 130 being received by the threat detectors themselves is, in some sense, for visual convenience and clarity.

In at least one embodiment, each of the threat detectors are authorized to add entries to the system blacklist 320, and do so via their respective blacklist feed. The threat detector 302 is the threat detector that is primarily described in the present disclosure, as it is one that utilizes a geotargeting machine-learning model as described herein. Each of the threat detectors can be thought of as a detection mechanism for a different type of threat and/or a different type of attack pattern. One or more of the threat detectors, as well as the threat-detection system 102 and/or one or more other entities described herein could be designed using a programming language such as Java, Python, Java Platform, Enterprise Edition (J2EE), C++, and/or the like.

One or more of the threat detectors could evaluate system-login attempts using one or more cumulative sum control chart (CUSUM) techniques. Used in statistical quality control among other contexts, CUSUM is a sequential analysis technique that involves the iterative (i.e., sequential) calculation of a cumulative sum. In embodiments of the present disclosure, one or more CUSUM models are used in one or more threat detectors, in addition to and in parallel with the machine-learning approaches disclosed herein, to detect aberrant behavior in connection with source IP addresses of login attempts, as described herein. As a general matter, CUSUM models can be effective at detecting high-volume-per-source-IP address activity from a relatively low number of source IP addresses. The CUSUM models are what are known as statistical behavioral models, and different threat detectors implementing different CUSUM models could analyze different time slices (e.g., a recent 5 minutes, a recent 15 minutes, and a recent 60 minutes) in order to attempt to identify threats. These models could assess login-failure rates over these different time frames, and flag instances in which a login-failure rate during any such time frame exceeds a baseline amount by a threshold number (e.g., 3, 4, or 5) of standard deviations, as an example. Moreover, in at least one embodiment, potential threats (e.g., blacklisted source IP addresses) identified using one or more CUSUM models are used to label training data for one or more machine-learning models.

In at least one embodiment, the multiple threat detectors in the threat-detection system 102 include a threat detector that identifies and removes false-positive entries from the system blacklist 320. For example, such a threat detector could look for false positives to remove from the system blacklist 320 by reviewing data from a previous 24-hour period. Another of the threat detectors could look for repeated nonce values in transactions. These nonce values are single-use random or pseudorandom numbers or other character strings that are associated with or inserted into the packets related to a given transaction. They are meant for a single transaction, so repeated appearance of the same nonce value in connection with multiple transactions typically indicates the potential presence of a bad actor.

Thus, via the threat-detection-system communication service 310, the threat-detection system 102 delivers, by collective action of the threat detectors, the system blacklist 320 to the login-processing system 106 in the form of the blacklist updates 134. The system blacklist 320 can include, in various different embodiments, blacklisted data items related to login attempts, where the blacklisted data items are of types such as IP addresses (e.g., source IP addresses), usernames, user agent strings, one or more other request header parameters, nonce values, device identifiers, and/or the like.

Figure 4:
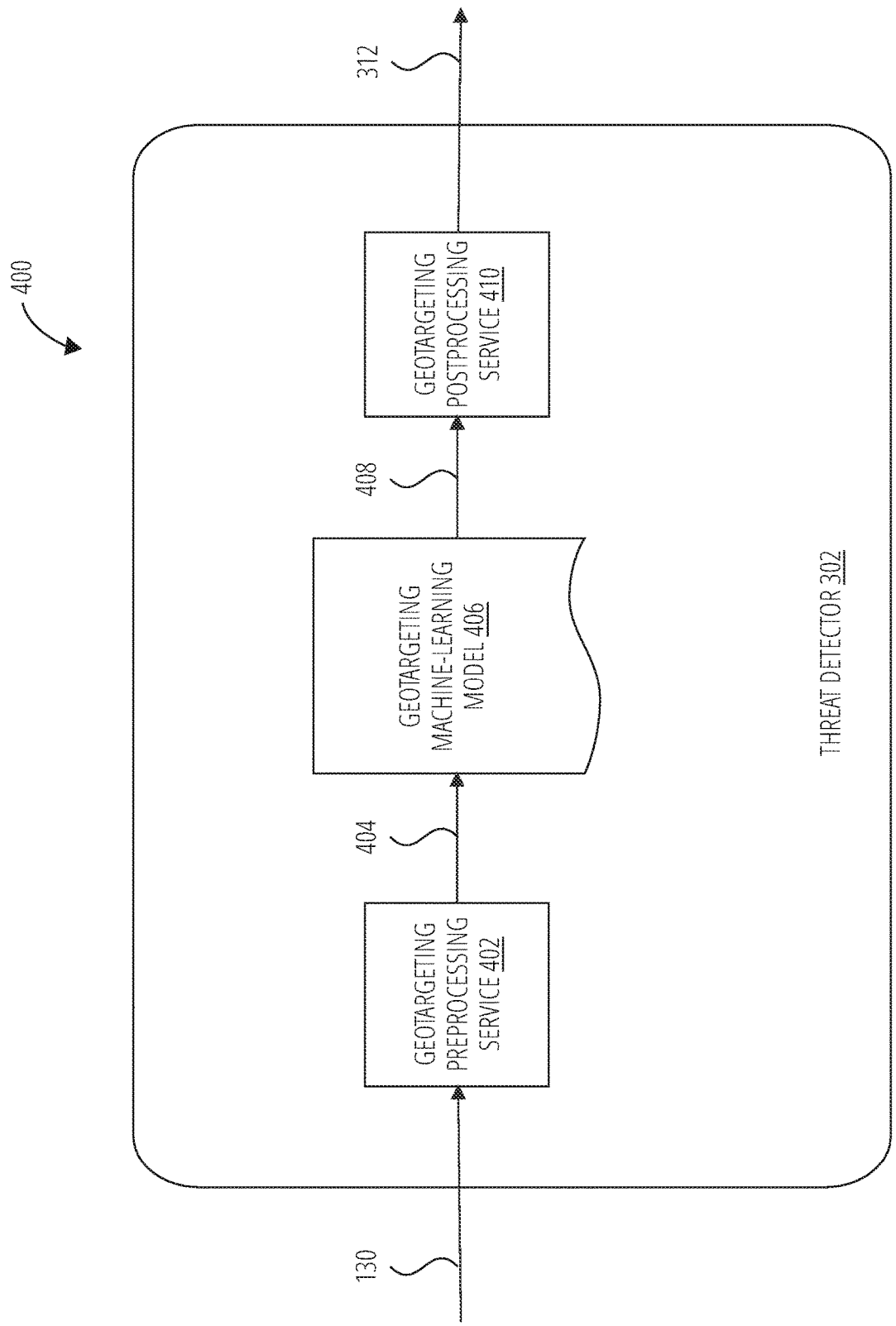
FIG. 4 illustrates an example architecture of the example threat detector of FIG. 3, where the example threat detector includes an example geotargeting machine-learning model that processes example geotargeting-model input data, in accordance with at least one embodiment.

FIG. 4 illustrates an example architecture 400 of the threat detector 302, in accordance with at least one embodiment. The architecture 400 is presented by way of example and not limitation, as other architectures could be used in various different implementations. Consistent with the previous figures, it can be seen in FIG. 4 that the threat detector 302 receives the login-attempt event-record updates 130 (from the data store 104) and outputs the blacklist feed 312 (to the system blacklist 320). In the embodiment that is depicted in FIG. 4, the threat detector 302 includes a geotargeting preprocessing service 402, a geotargeting machine-learning model 406, and a geotargeting postprocessing service 410.

The geotargeting preprocessing service 402 receives the login-attempt event-record updates 130, conducts some preprocessing that is further described below, and outputs what is referred to herein as geotargeting-model input data 404 to the geotargeting machine-learning model 406. The geotargeting machine-learning model 406 is configured to receive the geotargeting-model input data 404, to conduct processing and analysis of the geotargeting-model input data 404 as described herein, and output what are referred to herein as geotargeting-model assessments 408 to the geotargeting postprocessing service 410. In turn, the geotargeting postprocessing service 410 is configured to receive the geotargeting-model assessments 408 from the geotargeting machine-learning model 406, conduct some postprocessing functions on the geotargeting-model assessments 408 as described herein, and output the blacklist feed 312 to the system blacklist 320.

It is noted that, with respect to the inputs and the outputs of the geotargeting machine-learning model 406, FIG. 4 depicts the geotargeting machine-learning model 406 in an already-trained state (i.e., being used, e.g., "in production" or "in inference"). The training of the geotargeting machine-learning model 406 is further discussed below in connection with FIG. 5 and FIG. 6, among others. Moreover, some example functions that are carried out in various embodiments by the geotargeting preprocessing service 402, the geotargeting machine-learning model 406, and the geotargeting-model assessments 408 are described below in connection with FIG. 7 and FIG. 8, among others.

Within the field of artificial intelligence (AI), machine learning is a subcategory in which computer systems are designed and created to be able to automatically learn and improve from experience without being explicitly (further) programmed. Within machine learning, there are at least three categories: reinforcement learning, unsupervised learning, and supervised learning. Reinforcement learning involves the use of various algorithms such as Monte Carlo, Q-learning, SARSA (state-action-reward-state-action), and/or the like. Unsupervised learning involves the use of various algorithms such as clustering algorithms, association algorithms, and/or the like. Embodiments of the present disclosure involve training a model using supervised learning-accordingly, various example supervised-learning algorithms are discussed herein.

Generally speaking, within the category of machine learning known as supervised learning, there are algorithms used for problems such as regression and classification. Regression algorithms (e.g., linear regression) are typically used to determine a numerical answer to a given problem (e.g., in the context of real-estate transactions, "What is the best price at which I should list my house?"), whereas classification algorithms are used to select one of multiple discrete outcomes (e.g., in the context of facial recognition, "Is this particular face that of an authorized user or not?"). As a general matter, the individual data items (e.g., images of faces in the example context of facial recognition) that are classified using a classification algorithm are referred to as observations, and the classification of a given new observation (as, e.g., "an authorized user" or "not an authorized user") is referred to as an assessment. The process of making such assessments is often referred to as inference.

Embodiments of the present systems and methods involve an example use of classification, in that a model classifies a given observation—e.g., a data structure or vector, some example contents of which are described herein—as being associated with an IP address that either "should be blacklisted" or "should not be blacklisted." It is noted that, for brevity, "should be blacklisted" and "should not be blacklisted" are referred to herein at times as "blacklisted" and "allowed," respectively. It is further noted that, for brevity and clarity of presentation, the act of classifying a given observation (i.e., a set or vector of one or more data values) that is associated with (i.e., has been aggregated on) a source IP address as "blacklisted" or "allowed" is described herein at times as the act of classifying the associated source IP address itself as "blacklisted" or "allowed."

Various different classification algorithms could be used, including decision trees, random forest, naïve Bayes, logistic regression, K Nearest Neighbor (KNN), neural networks, and deep neural networks, as examples. In most of the embodiments discussed herein, a type of random-forest algorithm known as distributed random forest (DRF) is used. One DRF algorithm that could be used is the DRF algorithm that is part of an AI platform provided by H2O.ai, which is headquartered in Mountain View, Calif. In some embodiments, a DRF model is constructed using an H2O.ai product known as H2O Flow.

Some aspects of example DRF algorithms are described herein. Some of these aspects are also aspects of random-forest algorithms. Moreover, it is noted that "model" is used herein as a term for an operative instance of a given algorithm. Thus, a DRF model is an operative instance of a machine-learning model that implements a DRF algorithm. At times herein, model and algorithm are used somewhat interchangeably.

A DRF algorithm is a type of classification algorithm known as an ensemble classifier, and is based on decision-tree algorithms, in which classification is carried out by splitting observations in successive nodes at successive levels of a decision tree. At each node, a decision-tree algorithm attempts to split the observations (that have progressed to that node) into two nodes in the next level of the tree in a manner such that the two new groups of observations will be as different from one another as possible (and as similar to one another as possible within each of the two new nodes).

Moreover, while binary decision trees (i.e., trees having nodes that split, if at all, into two further nodes) are primarily described herein, it is noted that decision trees can be used that split one or more nodes into more than two nodes at the next level of the decision tree. Similarly, while the example classification models that are primarily discussed herein classify observations into one of two classes (i.e., "blacklisted" or "allowed"), it is certainly the case that classification models could be used to classify observations into one of any suitable number of classes depending on the particular details of a given implementation in a given context.

Functionally, when a decision-tree algorithm splits a given node into multiple nodes at the next level of the decision tree, the decision-tree algorithm splits the respective set of observations at that node using a numerical evaluation of a given feature (i.e., property) of the observations. To continue the facial-recognition example, an example feature could be, e.g., a distance between the respective centerpoints of the pupils of the person's eyes, and the decision-tree algorithm could, at a given node, split the observations as being either less than or not less than an average value such as 63 millimeters (mm), as an example.

As stated above, a DRF algorithm is an ensemble classifier, and it operates—as suggested by its name—by using, for each classification decision, a relatively large number of individual decision trees that operate collectively: each individual decision tree is essentially a voter for one of the classification options. Using a two-classes example, in some implementations, in the context of a given observation, the classification that receives more votes than the other becomes the classification made by the DRF model for that observation. In other implementations, for a given observation, one of the two classifications (e.g., "blacklisted") becomes the classification made by the DRF model if and only if that particular classification receives more than a threshold amount—e.g., number, fraction (e.g., $7/13$), percentage (e.g., 54%), or the like—of the total votes cast by the decision trees in the ensemble (i.e., the forest), and otherwise the other of the two classifications (e.g., "allowed") is selected for the given observation.

There are at least two conditions or aspects that tend to make DRF models do a better job of classifying observations than they would if either or both of the two conditions were not present. Those two conditions are briefly described below.

First, DRF models generally make more accurate classifications when the features, which are structural inputs to the DRF model and are discussed more fully below, have been selected such that there is an information signal somewhere in the collective features, where that information signal is relevant and useful to the classification decision that is being made. Some example features that are used in embodiments of the present disclosure are described herein.

Second, DRF models generally make more accurate classifications when the various decision trees in the forest are correlated with one another to a lesser as opposed to a greater extent. In other words, the less correlated the various decision trees in the forest are with one another, the better the forest will function as a whole. An analogy can be made to relatively more-diverse investment portfolios tending to perform better over time as compared with relatively less-diverse investment portfolios.

The substance of (i.e., the coefficients in) the decision trees in the random forest—and therefore the level of correlation among the trees—is determined during the training phase of the DRF model. The training phase is discussed more fully below. To achieve a lower level of correlation among the decision trees in the random forest, some embodiments make use, during the training phase, of one or both of the techniques that are known as bagging and feature randomness, each of which is described below.

Bagging, short for "bootstrap aggregation," is a technique according to which each decision tree in the DRF model randomly samples from the feature set with replacement, while typically, though not necessarily, still processing all of the observations in the training set. Thus, as an example of bagging, if a feature set contained six features $F_1$-$F_6$, a random process would be carried out that would result in some of the decision trees using the full set of features (i.e., $\{F_1, F_2, F_3, F_4, F_5, F_6\}$), with other trees using a differently constituted set of the six features. For example, one of the trees (i.e., the classifiers) might use the feature set $\{F_1, F_2, F_2, F_4, F_5, F_5\}$. In that example, $F_3$ has been randomly replaced by a second occurrence of $F_2$, and $F_6$ has been randomly replaced by a second occurrence of $F_5$. Using bagging then, not all of the trees can even "see" (i.e., classify based on) all of the features of the DRF model, increasing the diversity of the forest as a whole.

Feature randomness is a technique according to which, during the training phase, each decision tree makes random decisions as to the feature that that decision tree uses at any given node to split the observations visible to that node. This is in contrast to a typical decision tree, which selects the feature on which to split observations based on a determination as to which feature would best split those observations into dissimilar groupings in the next level of the tree. By introducing randomness into the decision of the feature that each node uses to split observations, the diversity of the random forest is enhanced.

Some embodiments of the present disclosure use bagging, and some do not. Furthermore, some embodiments use feature randomness, and some do not. Bagging results in trees being trained on different sets of data. Feature randomness results in trees making decisions based on different sets of features. Embodiments that utilize both bagging and feature randomness during the training phase end up containing trees that are not only trained on different sets of data but also use different features to make decisions. In such embodiments, as compared with embodiments in which neither or only one of those two techniques is used, cross-tree correlations are reduced, diversity is enhanced, and the accuracy of the classifications made by the DRF model is enhanced as well.

Figure 5:
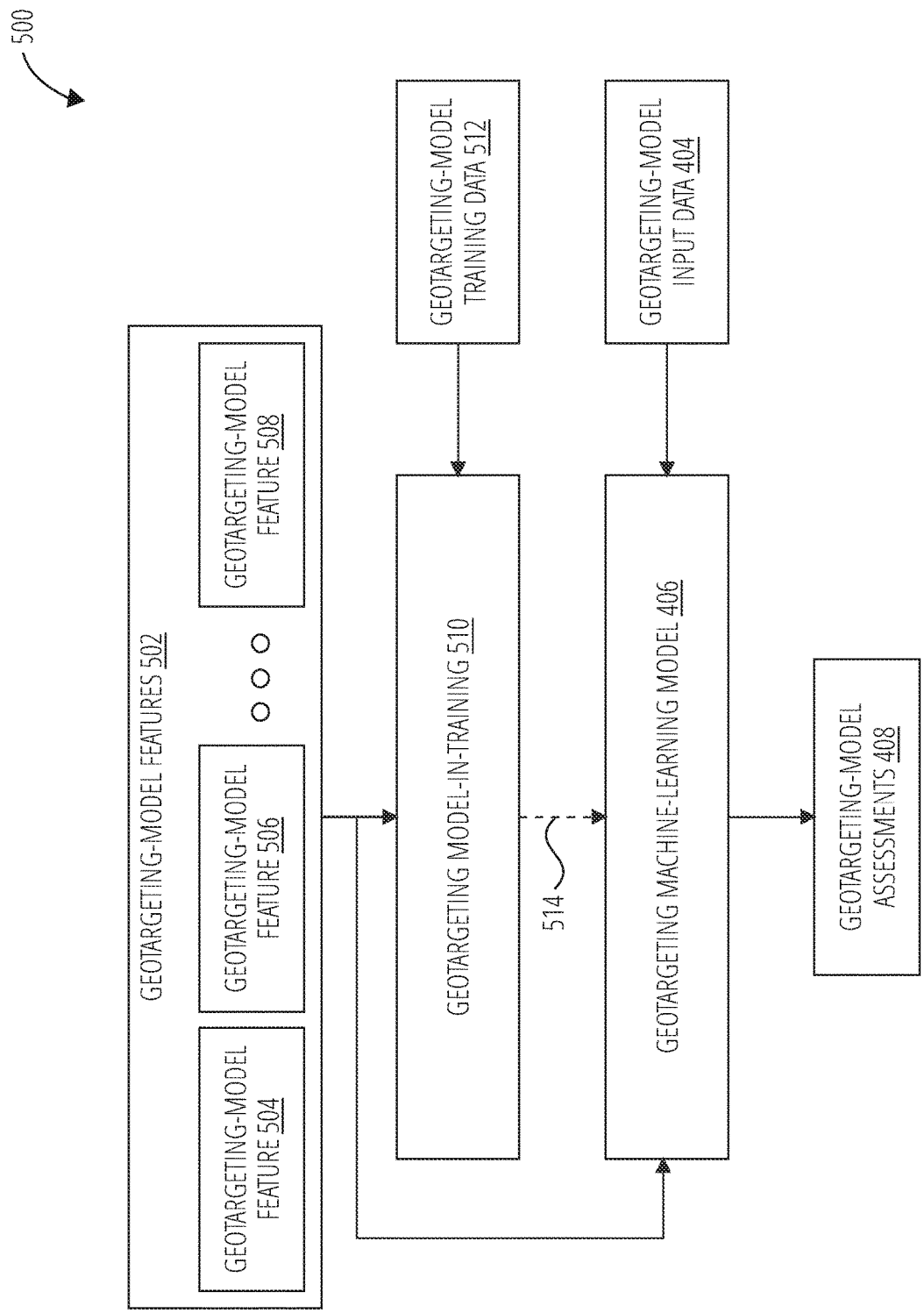
FIG. 5 illustrates an example machine-learning framework that includes the example geotargeting-model input data and the example geotargeting machine-learning model of FIG. 4, as well as example geotargeting-model training data, in accordance with at least one embodiment.

FIG. 5 illustrates an example machine-learning framework 500 with respect to the geotargeting machine-learning model 406 of FIG. 4, in accordance with at least one embodiment. The machine-learning framework 500 that is depicted in FIG. 5, as well as this accompanying description, together with FIG. 6 and FIG. 7 and the descriptions thereof, are intended to give the reader an understanding of, in example embodiments, the structure as well as the content of both the training data and the geotargeting-model input data 404, the process by which the geotargeting machine-learning model 406 is trained, and the type of assessments that the geotargeting machine-learning model 406 is trained to make. In FIG. 5, the data inputs and outputs are shown with solid-line arrows, whereas a transition 514 between a geotargeting model-in-training 510 and the geotargeting machine-learning model 406 is shown using a dashed-line arrow.

As an overview of the machine-learning framework 500, which is described in more detail below, it can be seen in FIG. 5 that the geotargeting model-in-training 510 takes as its two inputs a set of geotargeting-model features 502 and a set of geotargeting-model training data 512, that the geotargeting model-in-training 510 evolves at the transition 514 into the geotargeting machine-learning model 406, and that the geotargeting machine-learning model 406 takes as its two inputs the geotargeting-model features 502 and the geotargeting-model input data 404, based on which the geotargeting machine-learning model 406 generates geotargeting-model assessments 408. It is noted that the geotargeting-model features 502 can also be thought of as part of the structure of the geotargeting model-in-training 510 and of the geotargeting machine-learning model 406, and in that sense not necessarily a data input. Thus, once the geotargeting machine-learning model 406 has been trained and is up and running "in production," the geotargeting machine-learning model 406 takes the geotargeting-model input data 404 as its input and generates the geotargeting-model assessments 408 as its output. Both the geotargeting-model training data 512 and the geotargeting-model input data 404 are structured according to the geotargeting-model features 502.

Each of the geotargeting-model features 502 is either an individual measurable property of the phenomenon being observed, which in embodiments of the present disclosure is system login attempts, or a derived or aggregated (but still measurable and numeric) property of that phenomenon. In the machine-learning context, a feature is akin to an explanatory variable that is used in statistical techniques such as linear regression. Choosing informative, discriminating, and independent features is important for effective operation of machine-learning programs in pattern recognition, classification, and regression. Features may be of different types, such as numbers, character strings, and graphs. In FIG. 5, the geotargeting-model features 502 are represented generally by a geotargeting-model feature 504, a geotargeting-model feature 506, and a geotargeting-model feature 508, indicating an arbitrary number of geotargeting-model features 502. An example set of geotargeting-model features 502 that is used in at least one embodiment is described below in connection with at least FIG. 6 and FIG. 7.

An example set of geotargeting-model training data 512, as well as some examples of training the geotargeting machine-learning model 406, are described below in connection with FIG. 6. In general, however, in at least some embodiments, there are phases of training, validation, and testing in order to complete the transition 514 from the geotargeting model-in-training 510 to the geotargeting machine-learning model 406. Once the training, validation, and testing phases are complete, the geotargeting machine-learning model 406 generates the geotargeting-model assessments 408 based on the geotargeting-model input data 404. An example set of geotargeting-model input data 404 is shown and described below in connection with FIG. 7. In at least one embodiment, each of the geotargeting-model assessments 408 is a classification of a set of aggregated data as either "blacklisted" or "allowed," where unbeknownst to the geotargeting machine-learning model 406, that set of aggregated data has been aggregated on and is therefore associated with a source IP address from which one or more login attempts have been made. Each such set of aggregated data is part of the geotargeting-model input data 404 and is structured according to the geotargeting-model features 502.

Further with respect to training, machine-learning techniques train models to accurately make predictions on data fed into the models. During a learning phase, the models are developed against a training dataset of inputs to train the models to correctly predict the output for a given input. Generally, the learning phase may be supervised, semi-supervised, or unsupervised, indicating a decreasing level to which the "correct" outputs are provided in correspondence to the training inputs. In a supervised-learning approach, as described herein in connection with embodiments of the present disclosure, all of the outputs are provided to the model, guiding the model to develop a general rule that maps the input to the output. In contrast, in an unsupervised-learning approach, the desired output is not provided for the inputs; as such, the model can develop its own rules to discover relationships within the training dataset. In a semi-supervised learning approach, an incompletely labeled training set is provided, with some of the outputs known and some unknown for the training dataset.

Models may be run against a training dataset for several epochs (e.g., iterations), in which the training dataset is repeatedly fed into the model to refine its results. For example, in a supervised-learning approach, a model is developed to predict the output for a given set of inputs, and is evaluated over several epochs to more reliably provide the output that is specified as corresponding to the given input for the training dataset. In another example, in an unsupervised-learning approach, a model is developed to cluster the training dataset into n groups, and is evaluated over several epochs as to how consistently it places a given input into a given group and how reliably it produces the n desired clusters across each epoch.

Once an epoch is run, the models are evaluated and the values of their variables (e.g., coefficients) are adjusted to attempt to better refine the model in an iterative fashion. In various aspects, the evaluations are biased against false negatives, biased against false positives, or evenly biased with respect to the overall accuracy of the model. The values may be adjusted in several ways depending on the machine-learning technique being used. For example, in a genetic or evolutionary algorithm, the values for the models that are most successful in predicting the desired outputs are used to develop values for models to use during the subsequent epoch, which may include random variation/mutation to provide additional data points. One of ordinary skill in the art will be familiar with several machine-learning algorithms that may be applied with the present disclosure, including linear regression, random forests, decision-tree learning, neural networks, deep neural networks, and the like.

Each model develops a rule or algorithm over several epochs by varying the values of one or more variables affecting the inputs to more closely map to a desired result, but as the training dataset may be varied, and is preferably very large, perfect accuracy and precision may not be achievable. A number of epochs that make up a learning phase, therefore, may be set as a given number of trials or a fixed time/computing budget, or may be terminated before that number/budget is reached when the accuracy of a given model is high enough or low enough or an accuracy plateau has been reached. For example, if the training phase is designed to run n epochs and produce a model with at least 95% accuracy, and such a model is produced before the $n^{th}$ epoch, the learning phase may end early and the produced model may be used as satisfying the end-goal accuracy threshold. Similarly, if a given model is inaccurate enough to satisfy a random-chance threshold (e.g., the model is only 55% accurate in determining true/false outputs for given inputs), the learning phase for that model may be terminated early, although other models in the learning phase may continue training. Similarly, when a given model continues to provide similar accuracy or vacillate in its results across multiple epochs—having reached a performance plateau—the learning phase for the given model may terminate before the epoch number and/or computing budget is reached.

Once the learning phase is complete, the models are finalized. In some example embodiments, models that are finalized are evaluated against testing criteria. In a first example, a testing dataset that includes known outputs for its inputs is fed into the finalized models to determine an accuracy of the model in handling data on which it has not been trained. In a second example, a false-positive rate or false-negative rate is used to evaluate the models after finalization. In a third example, a delineation between data clusterings is used to select a model that produces the clearest bounds for its clusters of data. Other approaches may be used as well.

Figure 6:
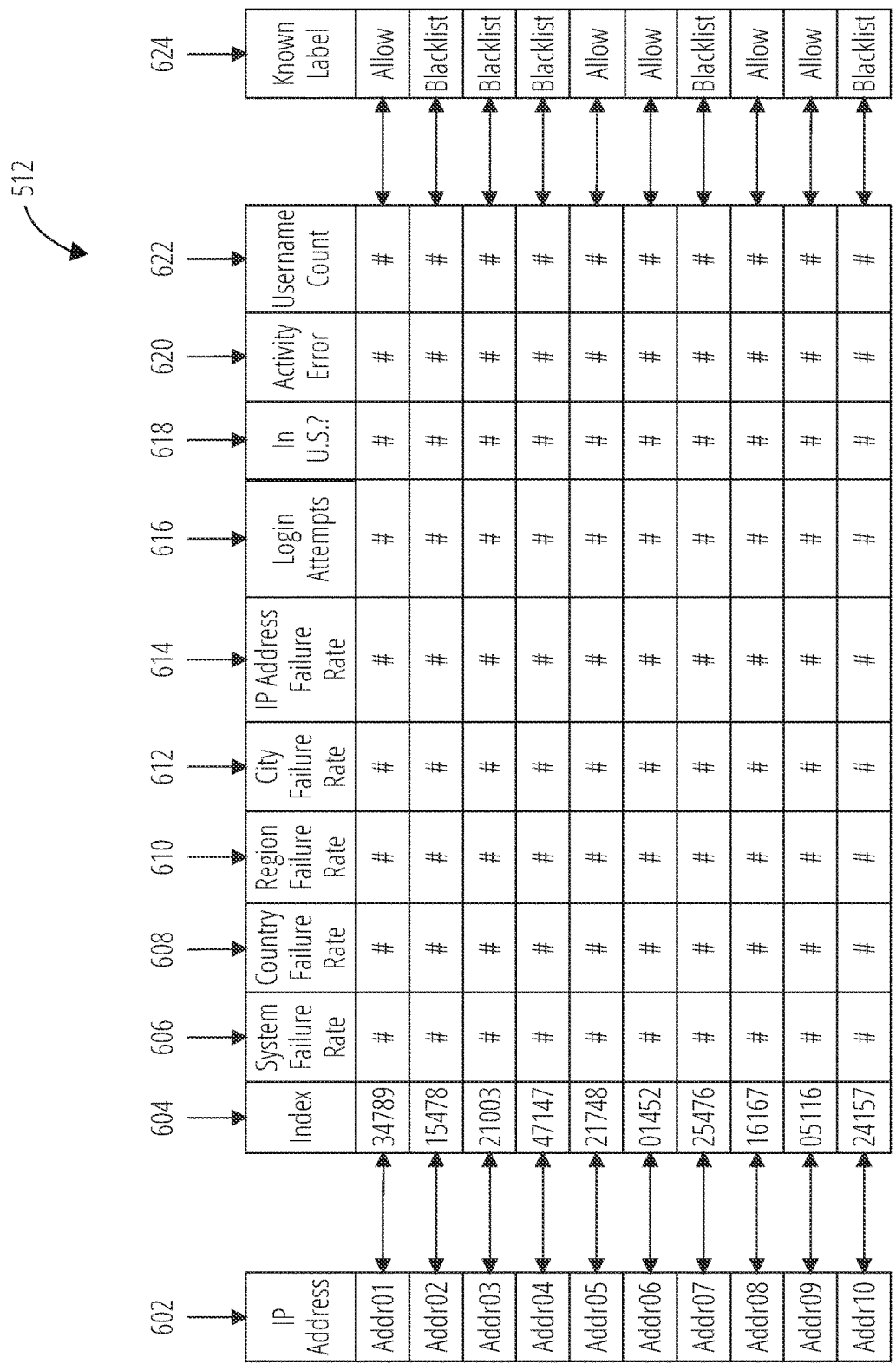
FIG. 6 illustrates the example geotargeting-model training data of FIG. 5, in accordance with at least one embodiment.

FIG. 6 illustrates the geotargeting-model training data 512. In particular, FIG. 6 depicts a subset of example geotargeting-model training data 512 that could be used in a given embodiment, together with a plurality of associated source IP addresses in an IP-address column 602. It is noted that different structures of training data could be used, and that only a small group of ten training-data vectors are displayed for purposes of illustration and not limitation.

In the IP-address column 602 are displayed ten example source IP addresses that are denoted "Addr01" through "Addr10," which are labels that are intended to represent arbitrary source IP addresses that could correspond to any of the client systems 114. Each such source IP address could be an IPv4 address or an IPv6 address, as examples. As indicated by the double-ended arrows between the IP-address column 602 and entries in a record-index column 604, each of the source IP addresses in the IP-address column 602 is associated with a respective vector that includes entries in columns 604-624.

Each row in FIG. 6 therefore includes data that is associated with a given source IP address from which one or more login attempts were made to the system in a time period during which the geotargeting-model training data 512 was collected. It is further noted that the geotargeting-model features 502 of the geotargeting model-in-training 510 and the geotargeting machine-learning model 406 are represented by the columns 606-622, and that different embodiments could use different combinations of these and/or other features as deemed suitable by those of skill in the art for a given implementation. As discussed more fully below, each of the rows is also associated with a label in a known-label column 624. In the columns 606-622 (i.e., the features), a numerical value is represented by the "#" character. In at least one embodiment, each such numerical value is a number between 0 and 1, inclusive. It is further noted that, in at least one embodiment, the values in the record-index column 604 are completely arbitrary and in fact not processed in any way by the geotargeting machine-learning model 406 other than as a bookkeeping mechanism for keeping track of which vectors of feature values correspond with which source IP addresses and with which labels.

The system-failure-rate column 606 could include numerical values that reflect a ratio of the number of login-attempt failures over the total number of login attempts on a system-wide basis in the corpus of training data. In an embodiment, the numerical values in the system-failure-rate column 606 would be the same in every row, since it is a system-wide value.

The country-failure-rate column 608 could include numerical values that reflect, in the training data, a ratio of the number of login-attempt failures in the country associated with the corresponding source IP address over the total number of login attempts in that country. In instances in which the various source IP addresses are associated with different countries, the values in the country-failure-rate column 608 could be different in some rows as compared with others.

The region-failure-rate column 610 could include numerical values that reflect, in the training data, a ratio of the number of login-attempt failures in the region associated with the corresponding source IP address over the total number of login attempts in that region. In instances in which the various source IP addresses are associated with different regions, the values in the region-failure-rate column 610 could be different in some rows as compared with others.

The city-failure-rate column 612 could include numerical values that reflect, in the training data, a ratio of the number of login-attempt failures in the city associated with the corresponding source IP address over the total number of login attempts in that city. In instances in which the various source IP addresses are associated with different cities, the values in the city-failure-rate column 612 could be different in some rows as compared with others.

The IP-address-failure-rate column 614 could include numerical values that reflect, in the training data, a ratio of the number of login-attempt failures from that particular corresponding source IP address over the total number of login attempts from that particular corresponding source IP address.

The total-logins column 616 could include numerical values that reflect, in the training data, the total number of login attempts from that particular corresponding source IP address. This could be a raw number (e.g., integer) or could be normalized to a 0-to-1 scale, among other options. The inclusion of both the IP-address-failure-rate column 614 and the total-logins column 616 could reflect that, not only is the failure rate of a given source IP address informative, but so is the magnitude of the number of login attempts being made from that source IP address. It is noted further that the raw or normalized number of login-attempt failures could be used instead of total number of login attempts, but that use of both would likely be redundant as not providing any further information than use of one or the other.

The set of geotargeting-model features 502 as represented in FIG. 6 in the columns 606-622 may also include one or more so-called binary or "one-hot" indicators, two of which are shown in the in-United-States column 618 and the activity-error column 620. The in-United-States column 618 may simply include a "0" if the given source IP address is not associated with (i.e., located in) the United States, and instead include a "1" if the given source IP address is associated with (i.e., located in) the United States. A one-hot encoding could be used with any one or more other geographical areas (e.g., countries, regions, cities, etc.) instead of or in addition to the U.S. It is further noted that, unlike the other features, such geographical-based one-hot encodings may not be particularly time-dependent.

The activity-error column 620 could include a "0" if the corresponding source IP address had not been associated, in the training data, with any login-error event in a set of one or more particular login-error events, and instead include a "1" if the corresponding source IP address had been associated with such a login-error event. It has been observed that the occurrence of such login-error events tend to be informative as to whether or not a given source IP address might otherwise be inaccurately blacklisted if such login-error events were not taken into account by the geotargeting machine-learning model 406. Examples of such login-error events are: Password Not Matched; Password Expired; and Received HTTP Get When Expecting HTTP Post. Other example login-error events could be used as features in various different embodiments. Moreover, one-hot encoding could be used with respect to each of multiple different types of login-error events, if desired.

Finally with respect to the feature columns 606-622, the username-count column 622 could include numerical values that reflect, in the training data, the number of distinct usernames that were used in connection with login attempts from the corresponding source IP address. It is noted that, due to the prevalence on the Internet of multi-user computers, proxy servers, and the like, it is not uncommon or even problematic for multiple usernames to be used in login attempts that originate from a given source IP address in a given time frame. It has nonetheless been found to be an informative feature with respect to making blacklist decisions. Similar to the numerical values in the total-logins column 616, the numerical values in the username-count column 622 could be raw numbers or could be normalized in some fashion (e.g., to a scale of 0-1).

It can further be seen in FIG. 6 that each of the rows contains a "Blacklist" or "Allow" label in the known-label column 624. In the geotargeting-model training data 512, a known label of "Blacklist" corresponds to the associated source IP address (i.e., the source IP address in that row) as having been blacklisted whereas a known label of "Allow" corresponds to the associated source IP address as having not been blacklisted. In an embodiment, an 18-month segment of results from one or more CUSUM models were used to apply "Blacklist" and "Allow" labels to a subsample of a 24-hour period of login-attempt data, in order to arrive at the geotargeting-model training data 512. The 24-hour period's worth of data was subsampled at a rate of about 9-10% with respect to all login attempts. The displayed feature columns 606-622 were then populated for that subsample by computing the geotargeting-model features 502 as aggregate data values for that subsample, and labeled according to the aforementioned CUSUM-model results. Other subsampling approaches, such as by source IP address, could be used in various embodiments. In some embodiments, training data can be used without subsampling.

Once the subsample (if used) has been taken, the aggregated geotargeting-model features 502 computed, and the labels applied, the training phase can be conducted on the geotargeting model-in-training 510 as shown in FIG. 5. In an embodiment, a maximum number (e.g., 3) of training epochs can be used, where each such training epoch constitutes a pass through the corpus of geotargeting-model training data 512.

During training, in at least one embodiment, the geotargeting model-in-training 510 builds classifiers (i.e., trees), and each such tree assesses each data point (i.e., vector) in the geotargeting-model training data 512 and casts a vote as to whether to classify that vector (and, unbeknownst to the geotargeting model-in-training 510, an associated source IP address) as either blacklisted or allowed. In an embodiment, whichever option gets a majority vote from the trees becomes the "guess" (i.e., classification) made by the geotargeting model-in-training 510 during that iteration. In some embodiments, a super majority (e.g., 54%) is required to classify as "blacklisted" as opposed to "allowed," and other approaches could be used as well. As the training continues, the trees are formed (in some cases using bagging and/or feature randomness), and the coefficients that govern the splitting of observations are adjusted. Once the training reaches a certain amount of time, iterations, and/or accuracy (as compared with the known labels), the training stops.

In at least one embodiment, after training, an automated validation phase is conducted. Prior to the training phase, the geotargeting-model training data 512 was divided into what is referred to herein as "pure training data," "validation data," and "testing data." In other embodiments, only "pure training data" and "testing data" are used, in which case there is not an automated validation phase. In some embodiments that use the automated validation phase, the geotargeting-model training data 512 is divided randomly into 60% pure training data, 20% validation data, and 20% testing data. Other divisions could be used as well. In embodiments that use only pure training data and testing data, a split such as 70%/30% or another suitable value could be used.

After an automated validation phase, a testing phase is also conducted. During both, the geotargeting model-in-training 510 is tested by submitting vectors that had not yet been seen by the geotargeting model-in-training 510, and checking the "Blacklisted" or "Allowed" outputs of the geotargeting model-in-training 510 against the known labels in the known-label column 624. If a satisfactory accuracy level is reached in both phases, the transition 514 is considered to be complete and the geotargeting machine-learning model 406 is accordingly ready to conduct inferences on the geotargeting-model input data 404. It is also noted that, in addition to suitable accuracy levels, those accuracy levels are checked in some embodiments to verify that they are within a tolerance of the accuracy level being achieved near the end of the training phase. If the training accuracy more than an acceptable tolerance higher than either or both of the validation accuracy and the testing accuracy, the model can said to be overfitting the training data. If, on the other hand, the training accuracy is more than an acceptable tolerance lower than either or both of the validation accuracy and the testing accuracy, the model can said to be underfitting the training data. It is generally desirable to avoid both.

In some embodiments, a procedure known as a grid search can be conducted in order to settle on a number of trees and a max depth of trees in the forest that compares favorably in metrics such as efficiency and accuracy with other tree-number-and-max-depth combinations that are tried. In development, forests of 50 trees, 100 trees, 150 trees, and 250 trees were tried, and the selected combination turned out to be 200 trees with a max depth of 15 for any given one of those 200 trees.

Figure 7:
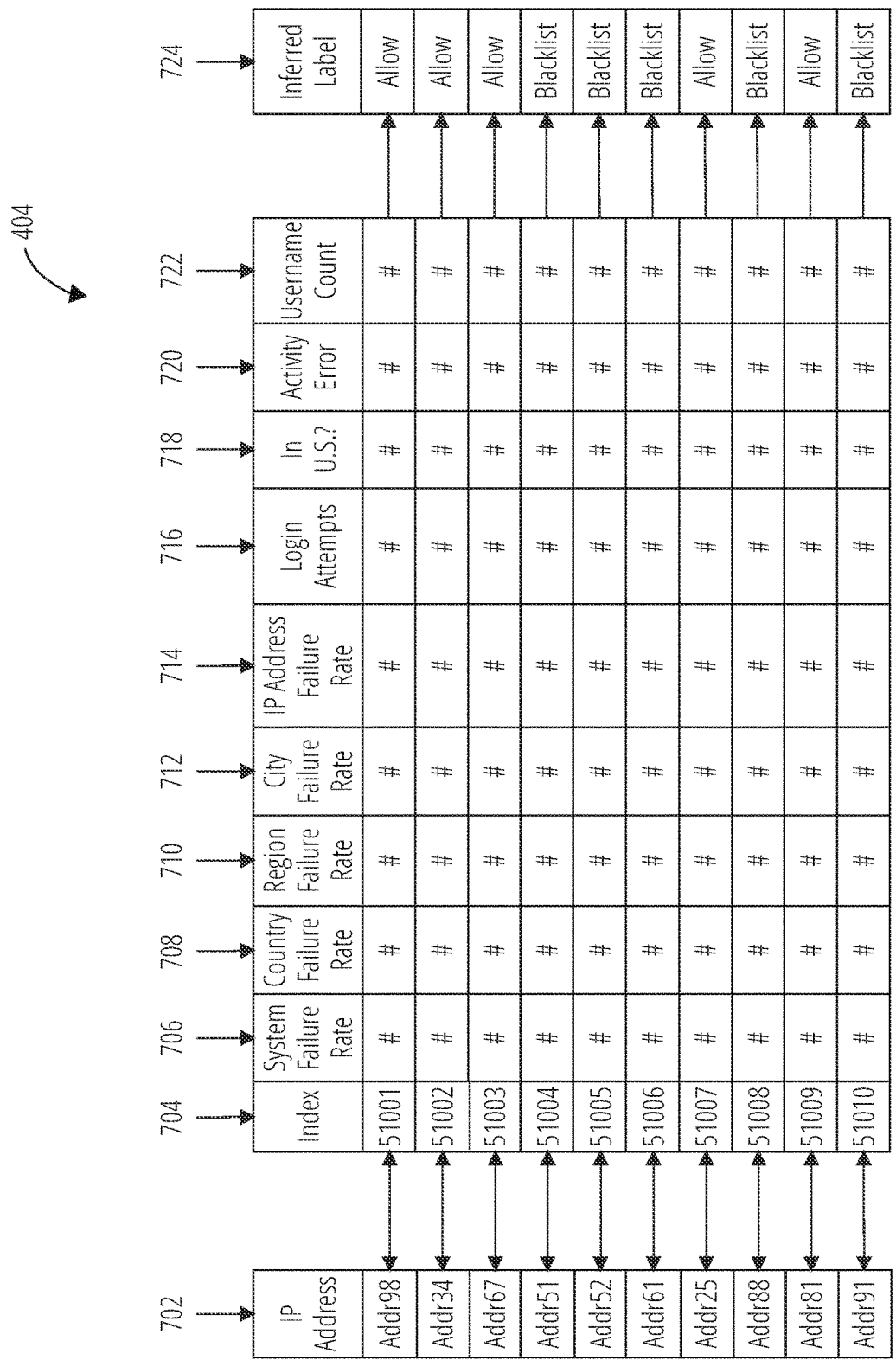
FIG. 7 illustrates the example geotargeting-model input data of FIG. 4, in accordance with at least one embodiment.

FIG. 7 illustrates the geotargeting-model input data 404, in accordance with at least one embodiment. In particular, FIG. 7 depicts a subset of example geotargeting-model input data 404 that could be used in a given embodiment, together with a plurality of associated source IP addresses in an IP-address column 702. It is noted that different structures of input data could be used, and that only a small group of ten input-data vectors are displayed for purposes of illustration and not limitation. The structure of FIG. 7 is similar in many ways to the structure of FIG. 6, and therefore FIG. 7 is not described in as great of detail. In FIG. 7, the geotargeting-model input data 404 is arranged in a similar tabular format, with some arbitrarily identified source IP addresses (e.g., "Addr98," "Addr34," and the like) in an IP-address column 702.

The double-ended arrows between the IP-address column 702 and a record-index column 704 similarly indicate that a source IP address in a given row is associated with an arbitrary index value in the record-index column 704 and with aggregated feature values in a system-failure-rate column 706, a country-failure-rate column 708, a region-failure-rate column 710, a city-failure-rate column 712, an IP-address-failure-rate column 714, a total-logins column 716, an in-United-States column 718, an activity-error column 720, and a username-count column 722. The numerical values in the feature columns 706-722 may be defined similarly to the numerical values in the feature columns 606-622 in FIG. 6, and these numerical values may be aggregated (e.g., computed) in similar ways. One difference in at least one embodiment, however, is that while the numerical values in the feature columns 606-622 in FIG. 6 were aggregated over an entire corpus of geotargeting-model training data 512, the numerical values in the feature columns 706-722 are aggregated over, e.g., a previous hour (e.g., a 60-minute period that ended on a most recent 30-second boundary). Other time frames could be used instead. In some embodiments, the numerical values are for all time, or since a last system reset, or some other possibility.

The single-ended arrows between the username-count column 722 and an inferred-label column 724 are meant to indicate that the labels shown in the inferred-label column 724 are a processed result of the data in the feature columns 706-722 after the numerical data in those feature columns 706-722 has been processed through the geotargeting machine-learning model 406. The depicted values of "Allow" and "Blacklist" were selected arbitrarily for purposes of illustration.

In operation, then, the geotargeting machine-learning model 406 takes a given row in the geotargeting-model input data 404 as input. In particular, the geotargeting machine-learning model 406 takes as input a vector that includes the numerical values from the feature columns 706-722. Every classifier (i.e., decision tree) in the ensemble (i.e., the distributed random forest) makes a classification of either blacklisted or allowed and accordingly casts its respective vote. For a given vector that corresponds with a given source IP address, then, the geotargeting machine-learning model 406 outputs a respective one of its geotargeting-model assessments 408. In some embodiments, the geotargeting-model assessments 408 are numerical values (e.g., values between 0-1) that reflect the fraction of trees that classified the vector as blacklisted, effectively voting to blacklist the associated source IP address. In other embodiments, the geotargeting-model assessments 408 are simple classifications: either blacklisted or allowed, depending on whether or not more than a threshold percentage (e.g., 50%, 54%, etc.) classified as blacklisted. These are design choices regarding whether a comparison of the percentage of trees voting to blacklist against a threshold occurs within the geotargeting machine-learning model 406 or within the geotargeting postprocessing service 410.

With respect to the geotargeting-model input data 404, the geotargeting preprocessing service 402 may receive the login-attempt event-record updates 130 from the data store 104 every, e.g., 30 seconds, and perform the associated aggregation computations to arrive at the next one or more vectors to feed into the geotargeting machine-learning model 406. In an embodiment, the geotargeting preprocessing service 402 may discard its oldest 30 seconds of login-attempt event-record updates 130 in favor of the most recently received login-attempt event-record updates 130, and then recompute any of the aggregated feature columns 706-722 that would be implicated by such discarding and adding of old and new data. In some embodiments, the geotargeting preprocessing service 402 simply recomputes all of the aggregated feature columns 706-722 every period (e.g., every 30 seconds).

Figure 8:
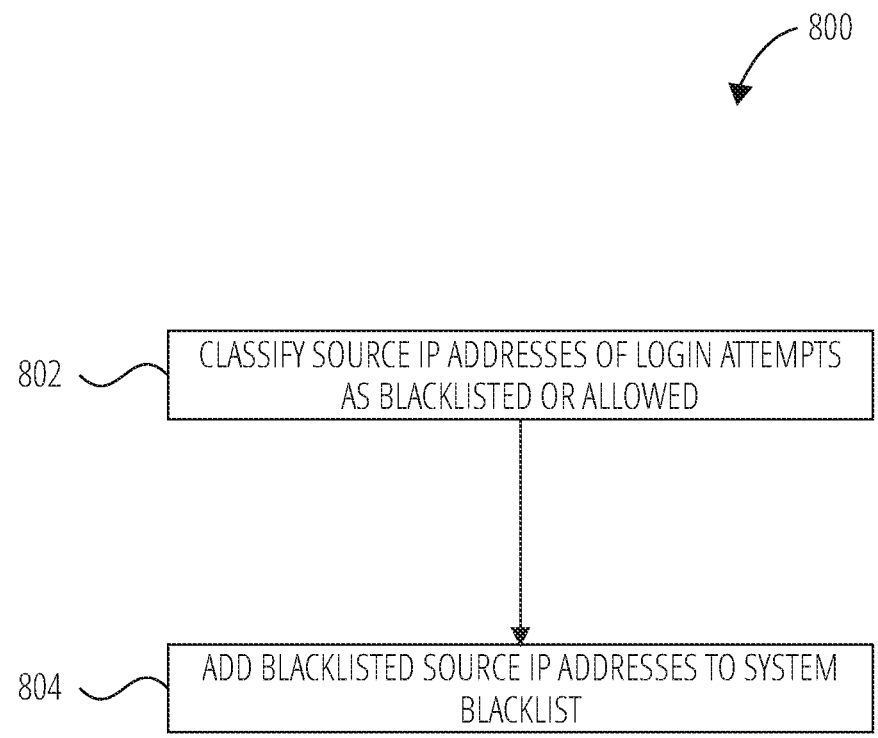
FIG. 8 illustrates an example method for using machine learning for geographic analysis of access attempts, in accordance with at least one embodiment.

FIG. 8 illustrates an example method for using machine learning for geographic analysis of access attempts, in accordance with at least one embodiment. In at least one embodiment, the method 800 is performed by a single device such as the threat-detection system 102. In at least one other embodiment, the method 800 is performed by a combination of multiple devices, systems, and/or the like; for example, the method 800 could be performed by a combination of the threat-detection system 102 and the login-processing system 106, among other possibilities. As a general matter, the method 800 could be performed by any one or any combination of devices, systems, and/or the like that are suitably equipped, programmed, and configured to perform the operations described herein. By way of example and not limitation, the method 800 is described below as being performed by the threat-detection system 102.

At operation 802, the threat-detection system 102 classifies, using the geotargeting machine-learning model 406, each of a plurality of source IP addresses as either blacklisted or allowed. The source IP addresses corresponds to login attempts to a system (e.g., a web portal to which successful logins via the login-processing system 106 provide access). The classifying of operation 802 is performed based on a set of aggregated geotargeting-model features 502 that correspond to login attempts from the source IP addresses that are being classified. Prior to the performing of the operation 802, the geotargeting machine-learning model 406 has been trained to classify source IP addresses as either blacklisted or allowed based on the geotargeting-model training data 512 and according to the set of aggregated geotargeting-model features 502.

As described above, in at least one embodiment, the geotargeting-model features 502 includes, in association with each respective source IP address, a geographical login-attempt failure rate of login attempts to the system from each of one or more geographical areas, where each such geographical area corresponds to the respective source IP address. As an example, the geotargeting-model features 502 could include a country login-attempt failure rate, a region login-attempt failure rate, and a city login-attempt failure rate for location associated with the corresponding source IP address. Any one or more of the other additional features, or one or more other features, could also be used in various different combinations in various embodiments.

In at least one embodiment, the threat-detection system 102 also obtains login-attempt event-record updates 130, which includes one or more source IP addresses, and generates the aggregated geotargeting-model features 502 for the plurality of source IP addresses in the login-attempt event-record updates 130. Doing so can include recomputing the geotargeting-model features 502 for, e.g., a previous hour based on, e.g., discarding an oldest 30 seconds of updated data and including a newest 30 seconds of updated data.

At operation 804, the threat-detection system 102 adds, to the system blacklist 320, any source IP addresses that are classified by the geotargeting machine-learning model 406 as blacklisted. In at least one embodiment, the system to which login attempts are directed (via, e.g., the login-processing system 106) is configured to disallow login attempts from any source IP addresses on the system blacklist 320. In at least one embodiment, as described above, the threat-detection system 102 also, from time to time, removes source IP addresses from the system blacklist 320 according to a blacklist-aging policy.

In at least one embodiment, the system blacklist 320 includes blacklist entries of multiple blacklisted-data types (including source IP addresses), and the system to which login attempts are directed (via, e.g., the login-processing system 106) is further configured to disallow login attempts associated with blacklist entries on the system blacklist of any of the multiple blacklisted-data types. In various different embodiments, the multiple blacklisted-data types include one or more of usernames, user agent strings, request-header parameters, nonce values, and device identifiers. Example device identifiers include a media access control (MAC) address, a wireless MAC address, an electronic serial number (ESN), an international mobile subscriber identity (IMSI), and/or the like.

Figure 9:
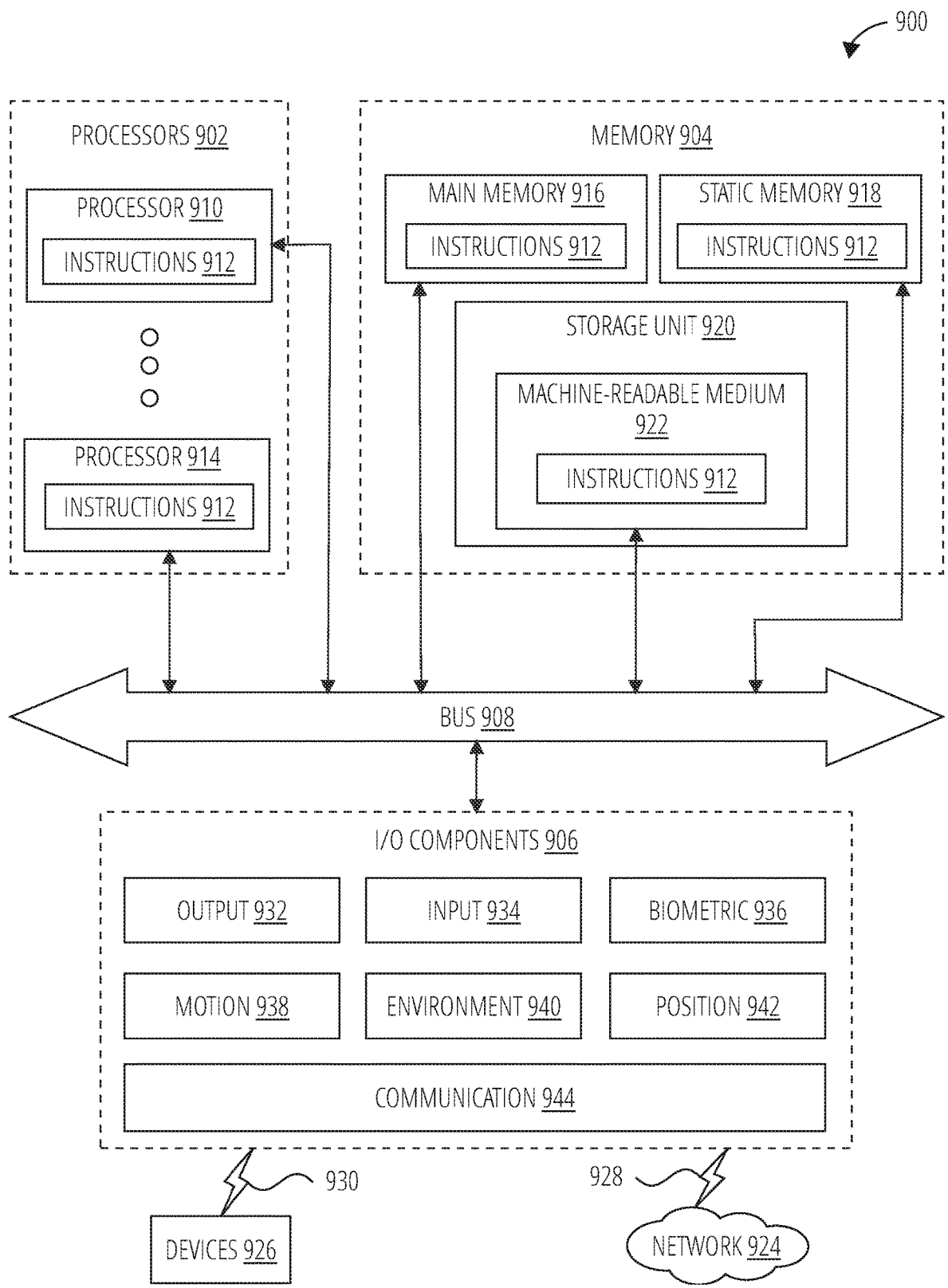
FIG. 9 illustrates an example machine in the form of a computer system within which a set of instructions can be executed for causing the machine to perform any one or more of the methodologies discussed herein, in accordance with at least one embodiment.

FIG. 9 illustrates an example machine 900 in the form of a computer system within which a set of instructions 912 (e.g., software, a program, an application, an applet, an app, and/or other executable code) can be executed for causing the machine 900 to perform any one or more of the methodologies discussed herein, in accordance with at least one embodiment. For example, the instructions 912 may cause the machine 900 to execute any one or more of the methods described herein. The instructions 912 transform the general, non-programmed machine 900 into a particular machine 900 programmed to carry out the described and illustrated functions in the manner described. The machine 900 may operate as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may be or include, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, and/or any other machine capable of executing the instructions 912, sequentially or otherwise, that specify actions to be taken by the machine 900. Further, while only a single machine 900 is illustrated, the term "machine" shall also be taken to include a collection of machines that individually or jointly execute the instructions 912 to perform any one or more of the methodologies discussed herein.

The machine 900 may include processors 902, memory 904, and I/O components 906, which may be configured to communicate with each other via a bus 908. In an example embodiment, the processors 902 (e.g., a central processing unit (CPU), a Reduced Instruction Set Computing (RISC) processor, a Complex Instruction Set Computing (CISC) processor, a graphics processing unit (GPU), a digital signal processor (DSP), an application-specific integrated circuit (ASIC), a radio-frequency integrated circuit (RFIC), another processor, and/or any suitable combination thereof) may include, for example, a processor 910 and a processor 914 that execute the instructions 912. The term "processor" is intended to include multi-core processors that may include two or more independent processors (sometimes referred to as "cores") that may execute instructions contemporaneously. Although FIG. 9 shows multiple processors 902, the machine 900 may include a single processor with a single core, a single processor with multiple cores (e.g., a multi-core processor), multiple processors with a single core, multiple processors with multiples cores, or any combination thereof.

The memory 904 includes a main memory 916, a static memory 918, and a storage unit 920, all accessible to the processors 902 via the bus 908. The memory 904, the static memory 918, and/or the storage unit 920 may store the instructions 912 embodying any one or more of the methodologies or functions described herein. The instructions 912 may also or instead reside, completely or partially, within the main memory 916, within the static memory 918, within machine-readable medium 922 within the storage unit 920, within at least one of the processors 902 (e.g., within the processor's cache memory), and/or any suitable combination thereof, during execution thereof by the machine 900.

The I/O components 906 may include a wide variety of components to receive input, produce and/or provide output, transmit information, exchange information, capture measurements, and/or the like. The specific I/O components 906 that are included in a particular instance of the machine 900 will depend on the type of machine. For example, portable machines such as mobile phones may include a touch input device or other such input mechanisms, while a headless server machine may not include such a touch input device. It will be appreciated that the I/O components 906 may include many other components that are not shown in FIG. 9. In various example embodiments, the I/O components 906 may include output components 932 and input components 934. The output components 932 may include visual components (e.g., a display such as a plasma display panel (PDP), a light emitting diode (LED) display, a liquid crystal display (LCD), a projector, and/or a cathode ray tube (CRT)), acoustic components (e.g., speakers), haptic components (e.g., a vibratory motor, resistance mechanisms), other signal generators, and so forth. The input components 934 may include alphanumeric input components (e.g., a keyboard, a touchscreen configured to receive alphanumeric input, a photo-optical keyboard, and/or other alphanumeric input components), point-based input components (e.g., a mouse, a touchpad, a trackball, a joystick, a motion sensor, and/or one or more other pointing instruments), tactile input components (e.g., a physical button, a touchscreen that is responsive to location and/or force of touches or touch gestures, and/or one or more other tactile input components), audio input components (e.g., a microphone), and/or the like.

In further example embodiments, the I/O components 906 may include biometric components 936, motion components 938, environmental components 940, and/or position components 942, among a wide array of other components. For example, the biometric components 936 may include components to detect expressions (e.g., hand expressions, facial expressions, vocal expressions, body gestures, eye tracking, and/or the like), measure biosignals (e.g., blood pressure, heart rate, body temperature, perspiration, brain waves, and/or the like), identify a person (by way of, e.g., voice identification, retinal identification, facial identification, fingerprint identification, electroencephalogram-based identification, and/or the like), and/or the like. The motion components 938 may include acceleration sensor components (e.g., an accelerometer), gravitation sensor components, rotation sensor components (e.g., a gyroscope), and so forth. The environmental components 940 may include, for example, illumination sensor components (e.g., a photometer), temperature sensor components (e.g., one or more thermometers), humidity-sensor components, pressure-sensor components (e.g., a barometer), acoustic-sensor components (e.g., one or more microphones), proximity-sensor components (e.g., infrared sensors that detect nearby objects), gas sensors (e.g., gas-detection sensors to detection concentrations of hazardous gases for safety or to measure pollutants in the atmosphere), and/or other components that may provide indications, measurements, signals, and/or the like that correspond to a surrounding physical environment. The position components 942 may include location-sensor components (e.g., a global positioning system (GPS) receiver), altitude-sensor components (e.g., altimeters or barometers that detect air pressure from which altitude may be derived), orientation-sensor components (e.g., magnetometers), and/or the like.

Communication may be implemented using a wide variety of technologies. The I/O components 906 may further include communication components 944 operable to communicatively couple the machine 900 to a network 924 and/or devices 926 via a coupling 928 and/or a coupling 930, respectively. For example, the communication components 944 may include a network-interface component or another suitable device to interface with the network 924. In further examples, the communication components 944 may include wired-communication components, wireless-communication components, cellular-communication components, Near Field Communication (NFC) components, Bluetooth (e.g., Bluetooth Low Energy) components, Wi-Fi components, and/or other communication components to provide communication via one or more other modalities. The devices 926 may include one or more other machines and/or any of a wide variety of peripheral devices (e.g., a peripheral device coupled via a universal serial bus (USB) connection).

Moreover, the communication components 944 may detect identifiers or include components operable to detect identifiers. For example, the communication components 944 may include radio frequency identification (RFID) tag reader components, NFC-smart-tag detection components, optical-reader components (e.g., an optical sensor to detect one-dimensional bar codes such as Universal Product Code (UPC) bar codes, multi-dimensional bar codes such as Quick Response (QR) codes, Aztec codes, Data Matrix, Dataglyph, MaxiCode, PDF417, Ultra Code, UCC RSS-2D bar codes, and/or other optical codes), and/or acoustic-detection components (e.g., microphones to identify tagged audio signals). In addition, a variety of information may be derived via the communication components 944, such as location via Internet Protocol (IP) geolocation, location via Wi-Fi signal triangulation, location via detecting an NFC beacon signal that may indicate a particular location, and/or the like.

One or more of the various memories (e.g., the memory 904, the main memory 916, the static memory 918, and/or the memory of the processors 902) and/or the storage unit 920 may store one or more sets of instructions and data structures (e.g., software) embodying or used by any one or more of the methodologies or functions described herein. These instructions (e.g., the instructions 912), when executed by processors 902, cause various operations to implement the disclosed embodiments.

The instructions 912 may be transmitted or received over the network 924, using a transmission medium, via a network-interface device (e.g., a network-interface component included in the communication components 944) and using any one of a number of well-known transfer protocols (e.g., the Session Initiation Protocol (SIP), the hypertext transfer protocol (HTTP), and/or the like). Similarly, the instructions 912 may be transmitted or received using a transmission medium via the coupling 930 (e.g., a peer-to-peer coupling) to the devices 926.

Figure 10:
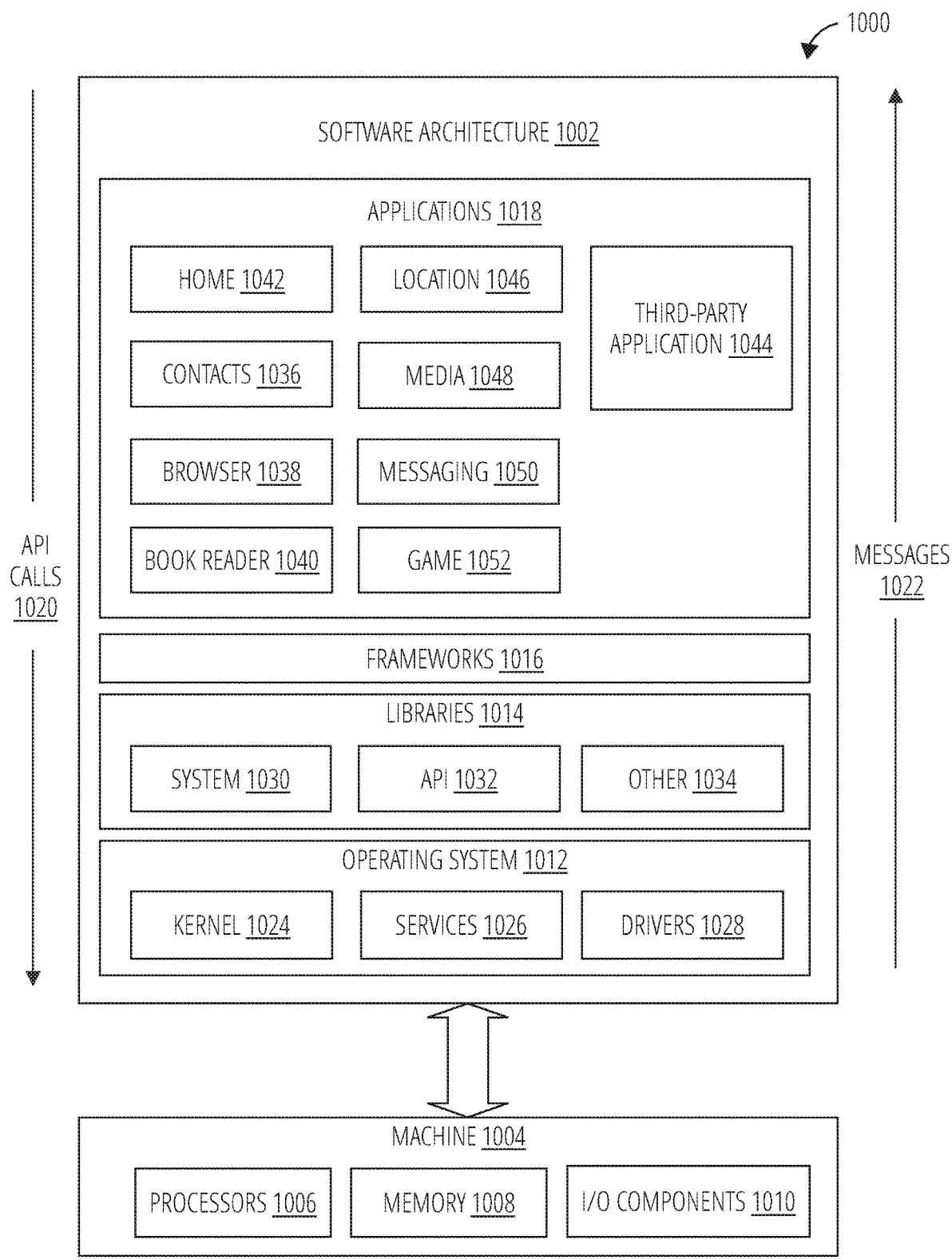
FIG. 10 illustrates an example software architecture within which one or more embodiments of the present disclosure can be implemented, in accordance with at least one embodiment.

FIG. 10 is a block diagram 1000 that illustrates an example software architecture 1002 within which one or more embodiments of the present disclosure can be implemented, in accordance with at least one embodiment. The software architecture 1002 can be installed on any one or more of the devices described herein. For example, the software architecture 1002 could be installed on any device or system that is arranged similar to the machine 900 of FIG. 9. The software architecture 1002 is supported by hardware such as a machine 1004 that includes processors 1006, memory 1008, and I/O components 1010. In this example, the software architecture 1002 can be conceptualized as a stack of layers, where each layer provides a particular functionality. The software architecture 1002 includes layers such an operating system 1012, libraries 1014, frameworks 1016, and applications 1018. Operationally, using one or more application programming interfaces (APIs), the applications 1018 invoke API calls 1020 through the software stack and receive messages 1022 in response to the API calls 1020.

The operating system 1012 manages hardware resources and provides common services. The operating system 1012 includes, for example, a kernel 1024, services 1026, and drivers 1028. The kernel 1024 acts as an abstraction layer between the hardware and the other software layers. For example, the kernel 1024 may provide memory management, processor management (e.g., scheduling), component management, networking, and/or security settings, in some cases among other functionality. The services 1026 can provide other common services for the other software layers. The drivers 1028 are responsible for controlling or interfacing with the underlying hardware. For instance, the drivers 1028 can include display drivers, camera drivers, Bluetooth or Bluetooth Low Energy drivers, flash memory drivers, serial communication drivers (e.g., USB drivers), Wi-Fi drivers, audio drivers, power management drivers, and/or the like.

The libraries 1014 provide a low-level common infrastructure used by the applications 1018. The libraries 1014 can include system libraries 1030 (e.g., C standard library) that provide functions such as memory-allocation functions, string-manipulation functions, mathematic functions, and/or the like. In addition, the libraries 1014 can include API libraries 1032 such as media libraries (e.g., libraries to support presentation and/or manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), Portable Network Graphics (PNG), and/or the like), graphics libraries (e.g., an OpenGL framework used to render in two dimensions (2D) and three dimensions (3D) in a graphic content on a display), database libraries (e.g., SQLite to provide various relational-database functions), web libraries (e.g., WebKit to provide web-browsing functionality), and/or the like. The libraries 1014 can also include a wide variety of other libraries 1034 to provide many other APIs to the applications 1018.

The frameworks 1016 may provide a high-level common infrastructure that is used by the applications 1018. For example, the frameworks 1016 may provide various graphical user interface (GUI) functions, high-level resource management, high-level location services, and/or the like. The frameworks 1016 can provide a broad spectrum of other APIs that can be used by the applications 1018, some of which may be specific to a particular operating system or platform.

Purely as representative examples, the applications 1018 may include a home application 1042, a contacts application 1036, a browser application 1038, a book-reader application 1040, a location application 1046, a media application 1048, a messaging application 1050, a game application 1052, and/or a broad assortment of other applications generically represented in FIG. 10 by a third-party application 1044. The applications 1018 are programs that execute functions defined in the programs. Various programming languages can be employed to create one or more of the applications 1018, structured in a variety of manners, such as object-oriented programming languages (e.g., Objective-C, Java, C++, and/or the like), procedural programming languages (e.g., C, assembly language, and/or the like), and/or the like. In a specific example, the third-party application 1044 (e.g., an application developed using the ANDROID™ or IOS™ software development kit (SDK) by an entity other than the vendor of the particular platform) could be mobile software running on a mobile operating system such as IOS™, ANDROID™, WINDOWS® Phone, and/or the like. In this example, the third-party application 1044 can invoke the API calls 1020 provided by the operating system 1012 to facilitate functionality described herein.

To promote an understanding of the principles of the present disclosure, various embodiments are illustrated in the drawings. The embodiments disclosed herein are not intended to be exhaustive or to limit the present disclosure to the precise forms that are disclosed in the above detailed description. Rather, the described embodiments have been selected so that others skilled in the art may utilize their teachings. Accordingly, no limitation of the scope of the present disclosure is thereby intended.

In any instances in this disclosure, including in the claims, in which numeric modifiers such as first, second, and third are used in reference to components, data (e.g., values, identifiers, parameters, and/or the like), and/or any other elements, such use of such modifiers is not intended to denote or dictate any specific or required order of the elements that are referenced in this manner. Rather, any such use of such modifiers is intended to assist the reader in distinguishing elements from one another, and should not be interpreted as insisting upon any particular order or carrying any other significance, unless such an order or other significance is clearly and affirmatively explained herein.

In this disclosure, one or more components of one or more devices, systems, and/or the like are referred to as modules that carry out (i.e., perform, execute, and the like) various functions. As used in the present disclosure, a module includes both hardware and instructions. The hardware could include one or more processors, one or more microprocessors, one or more microcontrollers, one or more microchips, one or more application-specific integrated circuits (ASICs), one or more field programmable gate arrays (FPGAs), one or more graphical processing units (GPUs), one or more tensor processing units (TPUs), and/or one or more devices and/or components of any other type deemed suitable by those of skill in the art for a given implementation. In some cases, a module includes at least one functional component (e.g., an application or part of an application, a block of code, and/or the like) executing in whole or in part on one or more processors.

The instructions for a given module are executable by the hardware for carrying out the one or more herein-described functions of the module, and could include hardware (e.g., hardwired) instructions, firmware instructions, software instructions, and/or the like, stored in any one or more non-transitory computer-readable media deemed suitable by those of skill in the art for a given implementation. Each such computer-readable medium could be or include memory (e.g., random access memory (RAM), read-only memory (ROM), erasable programmable read-only memory (EPROM), electrically erasable programmable read-only memory (EEPROM a.k.a. $E^2$PROM), flash memory, and/or one or more other types of memory) and/or one or more other types of non-transitory computer-readable medium. A module could be realized as a single component or be distributed across multiple components as deemed suitable by those of skill in the art.

Moreover, consistent with the fact that the entities and arrangements that are described herein, including the entities and arrangements that are depicted in and described in connection with the drawings, are presented as examples and not by way of limitation, any and all statements or other indications as to what a particular drawing "depicts," what a particular element or entity in a particular drawing or otherwise mentioned in this disclosure "is" or "has," and any and all similar statements that are not explicitly self-qualifying by way of a clause such as "In at least one embodiment," and that could therefore be read in isolation and out of context as absolute and thus as a limitation on all embodiments, can only properly be read as being constructively qualified by such a clause. It is for reasons akin to brevity and clarity of presentation that this implied qualifying clause is not repeated ad nauseum in this disclosure.

What is claimed is:

1. A method comprising:
classifying, using a machine-learning model, each of a plurality of source IP addresses as either blacklisted or allowed,
the source IP addresses corresponding to login attempts to a system,
the classifying being performed based on a set of aggregated features corresponding to login attempts to the system from the source IP addresses being classified,
the machine-learning model having been trained to classify source IP addresses as either blacklisted or allowed based on training data and according to the set of aggregated features,
the set of aggregated features comprising, in association with each respective source IP address, a geographical login-attempt failure rate of login attempts to the system from each of one or more geographical areas, each such geographical area corresponding to the respective source IP address; and
adding, to a system blacklist for the system, any source IP addresses classified by the machine-learning model as blacklisted, the system being configured to disallow login attempts from any source IP addresses on the system blacklist.

2. The method of claim 1, further comprising:
obtaining an updated set of login-attempt data, wherein the updated set of login-attempt data comprises the plurality of source IP addresses; and
generating the aggregated features for the plurality of source IP addresses in the updated set of login-attempt data.

3. The method of claim 1, wherein the machine-learning model comprises a random-forest-type machine-learning model.

4. The method of claim 1, wherein the set of aggregated features corresponds to login attempts from the source IP addresses during a time period.

5. The method of claim 1, wherein the one or more geographical areas comprise multiple, nested geographical areas.

6. The method of claim 5, wherein the multiple, nested geographical areas comprise two or more of a hemisphere, a country, an inter-country region, an intra-country region, a province, a state, a county, a city, a postal code, an area code, a borough, and a neighborhood.

7. The method of claim 1, wherein the set of aggregated features further comprises a systemwide login-attempt failure rate for the system.

8. The method of claim 1, wherein the set of aggregated features further comprises, for each respective source IP address, a login-attempt failure rate for the respective source IP address.

9. The method of claim 1, wherein the set of aggregated features further comprises, for each respective source IP address, one or both of a number of login-attempt failures and a total number of login attempts.

10. The method of claim 1, wherein the set of aggregated features further comprises, for each respective source IP address, a binary indicator as to whether or not the respective source IP address corresponds to a particular geographic area.

11. The method of claim 10, wherein the particular geographic area is a particular country.

12. The method of claim 1, wherein the set of aggregated features further comprises, for each respective source IP address, a binary indicator as to whether or not one or more of a set of particular login-failure types have occurred in connection with the respective source IP address.

13. The method of claim 1, wherein the set of aggregated features further comprises, for each respective source IP address, a number of distinct usernames that have been used in login attempts originating from the respective source IP address.

14. The method of claim 1, wherein:
the system comprises a plurality of attack-detection modules that are each authorized to add entries to the system blacklist;
the plurality of attack-detection modules comprises a first attack-detection module; and
the first attack-detection module comprises the machine-learning model.

15. The method of claim 14, wherein the plurality of attack-detection modules further comprises one or more attack-detection modules that evaluate system login attempts using one or more cumulative sum control chart (CUSUM) techniques.

16. The method of claim 1, wherein:
the system blacklist comprises blacklist entries of multiple blacklisted-data types;
the multiple blacklisted-data types include source IP addresses; and
the system is further configured to disallow login attempts associated with blacklist entries on the system blacklist of any of the multiple blacklisted-data types.

17. The method of claim 16, wherein the multiple blacklisted-data types comprise one or more of usernames, user agent strings, request-header parameters, nonce values, and device identifiers.

18. The method of claim 1, further comprising removing source IP addresses from the system blacklist according to a blacklist-aging policy.

19. A computing system comprising:
at least one processor; and
data storage containing instructions executable by the at least one processor for causing the computing system to perform operations comprising:
classifying, using a machine-learning model, each of a plurality of source IP addresses as either blacklisted or allowed,
the source IP addresses corresponding to login attempts to a system,
the classifying being performed based on a set of aggregated features corresponding to login attempts to the system from the source IP addresses being classified,
the machine-learning model having been trained to classify source IP addresses as either blacklisted or allowed based on training data and according to the set of aggregated features,
the set of aggregated features comprising, in association with each respective source IP address, a geographical login-attempt failure rate of login attempts to the system from each of one or more geographical areas, each such geographical area corresponding to the respective source IP address; and
adding, to a system blacklist for the system, any source IP addresses classified by the machine-learning model as blacklisted, the system being configured to disallow login attempts from any source IP addresses on the system blacklist.

20. One or more non-transitory computer-readable storage media containing instructions that, when executed by at least one processor, cause the at least one processor to perform operations comprising:

classifying, using a machine-learning model, each of a plurality of source IP addresses as either blacklisted or allowed, the source IP addresses corresponding to login attempts to a system, the classifying being performed based on a set of aggregated features corresponding to login attempts to the system from the source IP addresses being classified, the machine-learning model having been trained to classify source IP addresses as either blacklisted or allowed based on training data and according to the set of aggregated features, the set of aggregated features comprising, in association with each respective source IP address, a geographical login-attempt failure rate of login attempts to the system from each of one or more geographical areas, each such geographical area corresponding to the respective source IP address; and adding, to a system blacklist for the system, any source IP addresses classified by the machine-learning model as blacklisted, the system being configured to disallow login attempts from any source IP addresses on the system blacklist.

\* \* \* \* \*

UNITED STATES PATENT AND TRADEMARK OFFICE
CERTIFICATE OF CORRECTION

| | |
|---|---|
| PATENT NO. | : 11,356,472 B1 |
| APPLICATION NO. | : 16/716346 |
| DATED | : June 7, 2022 |
| INVENTOR(S) | : Maiorana et al. |

Page 1 of 1

It is certified that error appears in the above-identified patent and that said Letters Patent is hereby corrected as shown below:

In the Claims

Column 29, Line 51, Claim 7, delete "systemwide" and insert --system-wide-- therefor Signed and Sealed this
Twenty-sixth Day of July, 2022

Katherine Kelly Vidal
*Director of the United States Patent and Trademark Office*